(12) United States Patent
Nagahara

(10) Patent No.: US 11,796,824 B2
(45) Date of Patent: Oct. 24, 2023

(54) IMAGE FORMING OPTICAL SYSTEM, PROJECTION TYPE DISPLAY DEVICE, AND IMAGING APPARATUS

(71) Applicant: FUJIFILM Corporation, Tokyo (JP)

(72) Inventor: Akiko Nagahara, Saitama (JP)

(73) Assignee: FUJIFILM Corporation, Tokyo (JP)

(*) Notice: Subject to any disclaimer, the term of this patent is extended or adjusted under 35 U.S.C. 154(b) by 219 days.

(21) Appl. No.: 17/509,237

(22) Filed: Oct. 25, 2021

(65) Prior Publication Data

US 2022/0146842 A1     May 12, 2022

(30) Foreign Application Priority Data

Nov. 12, 2020 (JP) ................................ 2020-188872
Aug. 25, 2021 (JP) ................................ 2021-137511

(51) Int. Cl.
| | | |
|---|---|---|
| G02B 27/09 | (2006.01) | |
| G02B 3/04 | (2006.01) | |
| G02B 15/14 | (2006.01) | |
| H04N 9/31 | (2006.01) | |
| H04N 23/55 | (2023.01) | |

(52) U.S. Cl.
CPC ........... G02B 27/0955 (2013.01); G02B 3/04 (2013.01); G02B 15/1465 (2019.08); H04N 9/3152 (2013.01); H04N 23/55 (2023.01)

(58) Field of Classification Search
CPC ...... G02B 27/0955; G02B 3/04; G02B 13/16; G02B 13/22; G02B 13/18; G02B 15/1465; G02B 15/14; G02B 9/3105
See application file for complete search history.

(56) References Cited

U.S. PATENT DOCUMENTS

| | | | | |
|---|---|---|---|---|
| 2010/0073775 A1* | 3/2010 | Ichimura | ............. | G02B 15/177 |
| | | | | 359/676 |
| 2017/0343782 A1 | 11/2017 | Amano | | |
| 2019/0162936 A1* | 5/2019 | Nagahara | ........... | G02B 13/0045 |

FOREIGN PATENT DOCUMENTS

| | | | | | |
|---|---|---|---|---|---|
| JP | 2016050989 A | * | 4/2016 | .......... | G02B 15/177 |
| JP | 2017-211479 A | | 11/2017 | | |

* cited by examiner

*Primary Examiner* — George G. King
*Assistant Examiner* — Anna Elizabeth Smith
(74) *Attorney, Agent, or Firm* — Studebaker & Brackett PC

(57) ABSTRACT

An image forming optical system consists of a first optical system and a second optical system in order from a magnification side. An intermediate image is formed between the first optical system and the second optical system. Among the aspherical lenses included in the first optical system, a specific lens, which is the aspherical lens closest to the intermediate image on the optical path, has a meniscus shape of which a surface is convex toward the reduction side in a paraxial region. The image forming optical system satisfies a maximum image height, a focal length, and predetermined conditional expressions for the specific lens.

18 Claims, 20 Drawing Sheets

EXAMPLE 1

EXAMPLE 1

EXAMPLE 2

EXAMPLE 4

EXAMPLE 5

IMAGE FORMING OPTICAL SYSTEM, PROJECTION TYPE DISPLAY DEVICE, AND IMAGING APPARATUS

CROSS-REFERENCE TO RELATED APPLICATIONS

The present application claims priority under 35 U.S.C. § 119 to Japanese Patent Application No. 2020-188872, filed on Nov. 12, 2020 and Japanese Patent Application No. 2021-137511, filed on Aug. 25, 2021. Each application above is hereby expressly incorporated by reference, in its entirety, into the present application.

BACKGROUND

Technical Field

The technique of the present disclosure relates to an image forming optical system, a projection type display device, and an imaging apparatus.

Related Art

As an image forming optical system applicable to a projection type display device and an imaging apparatus, for example, the optical system described in JP2017-211479A below is known.

In recent years, there has been a demand for an image forming optical system which has a wide angle of view, a small size, excellent manufacturability and assembling property, and favorable optical performance by appropriately correcting various aberrations.

SUMMARY

The present disclosure has been made in view of the above circumstances, and an object of the present disclosure is to provide an image forming optical system, which is excellent in manufacturability and assembling property and maintains favorable optical performance by achieving a small size while having a wide angle of view, a projection type display device comprising the image forming optical system, and an imaging apparatus comprising the image forming optical system.

The image forming optical system according to one aspect of the technique of the present disclosure is an image forming optical system consisting of a first optical system and a second optical system in order from a magnification side to a reduction side along an optical path. An intermediate image is formed on the optical path between the first optical system and the second optical system, the first optical system includes at least one aspherical lens, among the aspherical lenses included in the first optical system, a specific lens, which is the aspherical lens closest to the intermediate image on the optical path, has a meniscus shape of which a surface is convex toward the reduction side in a paraxial region, and assuming that a distance from an intersection between an optical axis and a normal line at a certain point P on a lens surface to the point P is a local radius of curvature at the point P, and a sign of the local radius of curvature is negative in a case where the intersection is closer to the magnification side than the point P, and is positive in a case where the intersection is closer to the reduction side than the point P, a sign of the local radius of curvature at an optional point within an effective diameter of a reduction side surface of the specific lens is negative, a maximum image height of the image forming optical system on the reduction side is Ymax, a focal length of the image forming optical system is f, a focal length of the specific lens is fA, a paraxial radius of curvature of a magnification side surface of the specific lens is Ra1, a paraxial radius of curvature of the reduction side surface of the specific lens is Ra2, a local radius of curvature at an intersection between the magnification side surface of the specific lens and a ray, which is incident into the image forming optical system from an image plane on the reduction side of the image forming optical system in parallel to the optical axis at a height of 2.5×|f| from the optical axis, is Rb1, a local radius of curvature at an intersection between the reduction side surface of the specific lens and the ray is Rb2, a height of the ray from the optical axis on the reduction side surface of the specific lens is H2, and f, Rb1, Rb2, and H2 are values at a wide-angle end in a case where the image forming optical system is a variable magnification optical system, Conditional Expressions (1), (2), (3), (4), (5), and (6) are satisfied, which are represented by $$2.5 \leq Y\max/|f| \leq 2.9 \tag{1},$$

$$-0.01 < |f|/fA < 0.03 \tag{2},$$

$$|Ra1| < |Rb1| \tag{3},$$

$$|Ra2| < |Rb2| \tag{4},$$

$$|Rb1| < |Rb2| \tag{5, and}$$

$$1.65 < |Ra2/H2| < 3 \tag{6}.$$

It is preferable that the image forming optical system of the above-mentioned aspect satisfies at least one of Conditional Expressions (1-1), (2-1), or (6-1).

$$2.5 \leq Y\max/|f| \leq 2.7 \tag{1-1}.$$

$$-0.01 < |f|/fA < 0.025 \tag{2-1}.$$

$$1.75 < |Ra2/H2| < 3 \tag{6-1}.$$

The image forming optical system of the above-mentioned aspect preferably satisfies Conditional Expression (7), and more preferably satisfies Conditional Expression (7-1).

$$-0.1 < (1/Rb1 - 1/Rb2) \times |f| < -0.015 \tag{7}.$$

$$-0.1 < (1/Rb1 - 1/Rb2) \times |f| < -0.02 \tag{7-1}.$$

It is preferable that assuming that a height of the ray from the optical axis on the magnification side surface of the specific lens is H1, and H1 is a value at the wide-angle end in a case where the image forming optical system is a variable magnification optical system, the magnification side surface of the specific lens within a radius |H1| from the optical axis is located, outside the optical axis, closer to the reduction side than a spherical surface that passes through an intersection between the optical axis and the magnification side surface of the specific lens, the spherical surface having a radius |Ra1| and a center that is on the optical axis, and the reduction side surface of the specific lens within a radius |H2| from the optical axis is located, outside the optical axis, closer to the reduction side than a spherical surface that passes through an intersection between the optical axis and the reduction side surface of the specific lens, the spherical surface having a radius |Ra2| and a center that is on the optical axis.

The image forming optical system of the above-mentioned aspect preferably satisfies Conditional Expression (8), and more preferably satisfies Conditional Expression (8-1).

$$1.35<|H2/(2.5\times f)|<1.8 \quad (8).$$

$$1.45<|H2/(2.5\times f)|<1.8 \quad (8\text{-}1).$$

In a case where one lens component is one cemented lens or one single lens, assuming that a maximum height of heights of the ray from the optical axis at two air contact surfaces intersecting the optical axis of the lens component closest to the reduction side in the first optical system, and heights of the ray from the optical axis at two air contact surfaces intersecting the optical axis of the lens component closest to the magnification side in the second optical system is Hmax, and Hmax is a value at the wide-angle end in a case where the image forming optical system is a variable magnification optical system, the image forming optical system of the above-mentioned aspect preferably satisfies Conditional Expression (9), and more preferably Conditional Expression (9-1).

$$1<|H\max/H2|<1.8 \quad (9).$$

$$1<|H\max/H2|<1.5 \quad (9\text{-}1).$$

It is preferable that a sign of a local radius of curvature at an optional point within an effective diameter of the magnification side surface of the specific lens is negative.

At least one optical path deflection member that deflects the optical path may be configured to be disposed inside the image forming optical system.

It is preferable that the image forming optical system of the above-mentioned aspect is a zoom optical system. In such a case, it is preferable that the second optical system includes a lens group that moves during varying a magnification.

It is preferable that the image forming optical system of the above-mentioned aspect is configured to be telecentric on the reduction side.

According to another aspect of the technique of the present disclosure, there is provided a projection type display device comprising: a light valve that outputs an optical image; and the image forming optical system according to the above-mentioned aspect, in which the image forming optical system projects the optical image, which is output from the light valve, on a screen.

According to still another aspect of the technique of the present disclosure, there is provided an imaging apparatus comprising the image forming optical system according to the above-mentioned aspect.

In the present specification, it should be noted that the terms "consisting of ~" and "consists of ~" mean that the lens may include not only the above-mentioned elements but also lenses substantially having no powers, optical elements, which are not lenses, such as a stop, a filter, and a cover glass, and mechanism parts such as a lens flange, a lens barrel, an imaging element, and a camera shaking correction mechanism.

The values used in conditional expressions are values in a case where the d line is set as a reference. The "d line", "C line", and "F line" described herein are bright lines, the wavelength of the d line is 587.56 nm (nanometers), the wavelength of the C line is 656.27 nm (nanometers), and the wavelength of the F line is 486.13 nm (nanometers).

According to the technique of the present disclosure, it is possible to provide an image forming optical system which has a wide angle of view, has a small size, is excellent in manufacturability and assembling property, and maintains favorable optical performance, a projection type display device including the image forming optical system, and an imaging apparatus including the image forming optical system.

DESCRIPTION OF EMBODIMENTS

Figure 1:
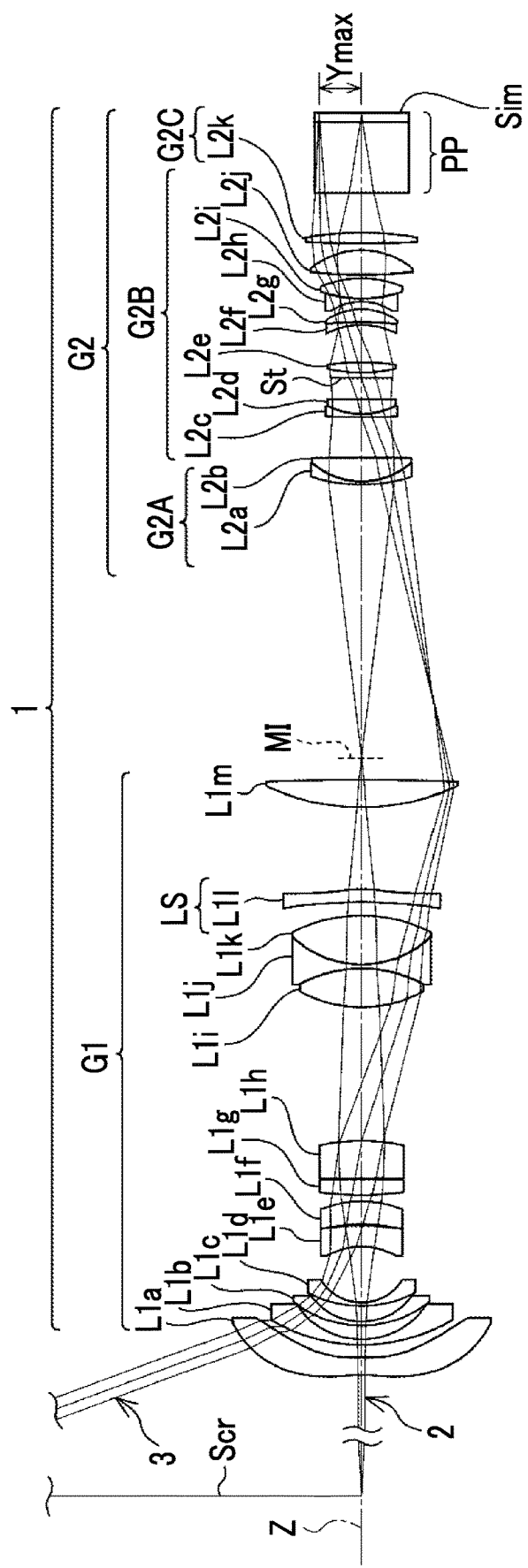
FIG. 1 is a cross-sectional view showing a configuration and luminous flux of an image forming optical system according to an example of an embodiment of the present disclosure corresponding to an image forming optical system of Example 1.

Hereinafter, an example of an embodiment according to the technique of the present disclosure will be described in detail with reference to the drawings. FIG. 1 shows a configuration in a cross section including an optical axis Z of an image forming optical system 1 according to an embodiment of the present disclosure. The configuration example shown in FIG. 1 corresponds to Example 1 described later. In FIG. 1, the left side is the magnification side and the right side is the reduction side, and the on-axis luminous flux 2 and the luminous flux 3 with the maximum image height Ymax are also shown.

The image forming optical system 1 according to the technique of the present disclosure may be a projection optical system mounted on a projection type display device, or may be an image forming optical system mounted on an imaging apparatus or the like. Hereinafter, the case of using the image forming optical system 1 in the application of the projection optical system will be described.

FIG. 1 shows an example in which an optical member PP is disposed on the reduction side of the image forming optical system 1, under the assumption that the image forming optical system 1 is mounted on a projection type display device. The optical member PP is a member such as a filter, a cover glass, a color synthesis prism, or the like. The optical member PP is a member having no power, and a configuration in which the optical member PP is omitted is also possible.

FIG. 1 also shows a screen Scr and an image display surface Sim of a light valve, under the assumption that the image forming optical system 1 is mounted on the projection type display device. In the projection type display device, luminous flux provided with image information on the image display surface Sim are incident on the image forming optical system 1 through the optical member PP, and are projected on the screen Scr through the image forming optical system 1. In the example of FIG. 1, the image display surface Sim corresponds to the image plane on the reduction side, and the screen Scr corresponds to the image plane on the magnification side. In the following description, the "magnification side" means the screen Scr side on the optical path, and the "reduction side" means the image display surface Sim side on the optical path.

The image forming optical system 1 consists of, in order from the magnification side to the reduction side along the optical path, a first optical system G1 and a second optical system G2. For example, in the image forming optical system 1 of FIG. 1, the first optical system G1 consists of lenses L1a to L1m in order from the magnification side to the reduction side, and the second optical system G2 consists of lenses L2a to L2d, an aperture stop St, and lenses L2e to L2k in order from the magnification side to the reduction side.

The image forming optical system 1 is a relay type optical system. An intermediate image MI of an image displayed on the image display surface Sim is formed inside the image forming optical system 1, and the intermediate image MI is projected onto the screen Scr, thereby forming a projected image. The system for forming an intermediate image MI is able to suppress an increase in the diameter of the magnification side lens while ensuring a wide angle of view, and thus is suitable for a projection type display device requiring a wide angle of view. In the image forming optical system 1, the intermediate image MI is formed on the optical path between the first optical system G1 and the second optical system G2. In FIG. 1, only a part of the intermediate image MI including the vicinity of the optical axis Z is simply indicated by a dotted line such that the position of the intermediate image MI on the optical axis Z can be seen. The intermediate image MI in FIG. 1 does not show an accurate shape.

Assuming that the maximum image height on the reduction side imaging surface is Ymax and the focal length of the image forming optical system 1 is f, the image forming optical system 1 may be configured to satisfy Conditional Expression (1). By not allowing the result of Conditional Expression (1) to be equal to or less than the lower limit, there is an advantage in ensuring a wide angle of view. By not allowing the result of Conditional Expression (1) to be equal to or greater than the upper limit, there is an advantage in suppressing an increase in size of the system. In order to obtain more favorable characteristics, it is more preferable that the image forming optical system 1 satisfies Conditional Expression (1-1).

$$2.5 \leq Y\max/|f| \leq 2.9 \qquad (1),$$

$$2.5 \leq Y\max/|f| \leq 2.7 \qquad (1\text{-}1).$$

The first optical system G1 includes at least one aspherical lens. Since the aspherical lens is included, this is advantageous for small F numbers, wide angle of view, and favorable aberration correction. Particularly, a wide viewing angle optical system is very effective in correcting distortion. In the example of FIG. 1, the lens L1a and the lens L11 are aspherical lenses.

Hereinafter, for convenience of description, among the aspherical lenses included in the first optical system G1, the aspherical lens closest to the intermediate image MI on the optical path will be referred to as a specific lens LS. That is, the specific lens LS is the aspherical lens closest to the reduction side on the optical path among the aspherical lenses included in the first optical system G1. In the example of FIG. 1, the lens L11 is a specific lens LS.

In a case where the focal length of the specific lens LS is fA, the image forming optical system 1 is configured to satisfy Conditional Expression (2) with respect to fA and the above f. In addition, all the "focal lengths" used in conditional expressions in this specification mean the focal lengths in the paraxial region. By not allowing the result of Conditional Expression (2) to be equal to or less than the lower limit, the specific lens LS does not have an excessively strong negative refractive power. Thus, the refractive power of the positive lens other than the specific lens LS, which is disposed in the vicinity of intermediate image MI, is prevented from becoming excessively strong, and there is an advantage in satisfactorily correcting distortion and field curvature. By not allowing the result of Conditional Expression (2) to be equal to or greater than the upper limit, it is possible to suppress an increase in sensitivity to an error. As a result, there is an advantage in improving manufacturability and assembling property. In order to obtain more favorable characteristics, it is preferable that the image forming optical system 1 satisfies Conditional Expression (2-1).

$$-0.01 < |f|/fA < 0.03 \qquad (2),$$

$$-0.01 < |f|/fA < 0.025 \qquad (2\text{-}1).$$

Further, the specific lens LS is configured to have a meniscus shape of which a surface is convex toward the reduction side in the paraxial region. Such a shape is advantageous for satisfactorily correcting distortion and field curvature.

The specific lens LS has an aspheric shape on both the magnification side surface and the reduction side surface, and is configured to satisfy predetermined conditional expressions for the surface shape. Hereinafter, terms and symbols relating to the conditional expressions will be described with reference to FIGS. 2, 3, and 4.

Figure 2:
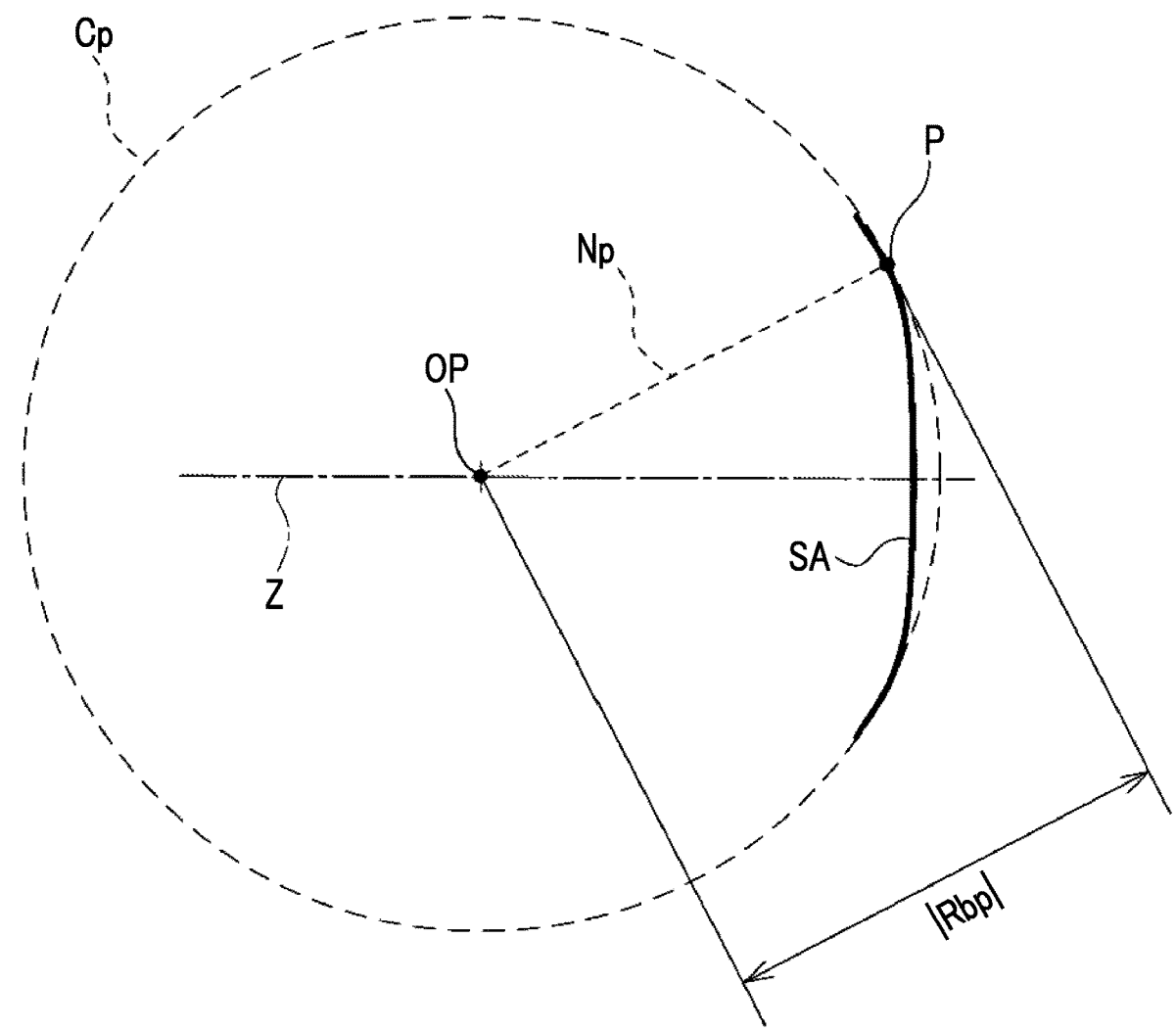
FIG. 2 is a diagram for explaining a local radius of curvature.

In an aspherical lens, the paraxial radius of curvature (that is, the radius of curvature in the paraxial region) does not constantly coincide with the radius of curvature at a point outside the paraxial region. Therefore, in the technique of the present disclosure, as shown in FIG. 2, a distance from the intersection OP of the normal line Np and the optical axis Z at a certain point P on the lens surface SA to the point P is defined as the local radius of curvature Rbp at the point P. The normal line Np is a line that is perpendicular to the tangent plane of the lens surface SA at the point P and passes through the point P. In FIG. 2, a length of the line segment connecting the intersection OP and the point P is represented as an absolute value |Rbp| of the local radius of curvature Rbp. For ease of understanding, FIG. 2 also shows a cross section of a spherical surface Cp having a radius of |Rbp|, centered on the intersection OP, and passing through the point P. It should be noted that FIG. 2 is a diagram showing an example for description. The local radius of curvature can be calculated at an optional point on the lens surface of an optional shape.

The sign of the local radius of curvature is negative in a case where the intersection OP is on the magnification side of the point P and is positive in a case where the intersection OP is closer to the reduction side than the point P. In FIG. 2, the left side of the drawing is the magnification side, and the right side is the reduction side. In the example of FIG. 2, the sign of the local radius of curvature at the point P is negative.

The image forming optical system 1 is configured such that the sign of the local radius of curvature at an optional point within the effective diameter of the reduction side surface of the specific lens LS is negative. Such a shape makes it possible to reduce the sensitivity to error. As a result, there is an advantage in improving manufacturability and assembling property. The effective diameter means a diameter of a circle consisting of the points farthest from the optical axis Z in the radial direction in a case where considering the intersection of all the ray contributing to the image formation and the lens surface.

Further, in the image forming optical system 1, it is preferable that the sign of the local radius of curvature at an optional point within the effective diameter of the magnification side surface of the specific lens LS is also negative. In such a case, the sensitivity to error can be made smaller. As a result, there is an advantage in improving manufacturability and assembling property.

Figure 3:
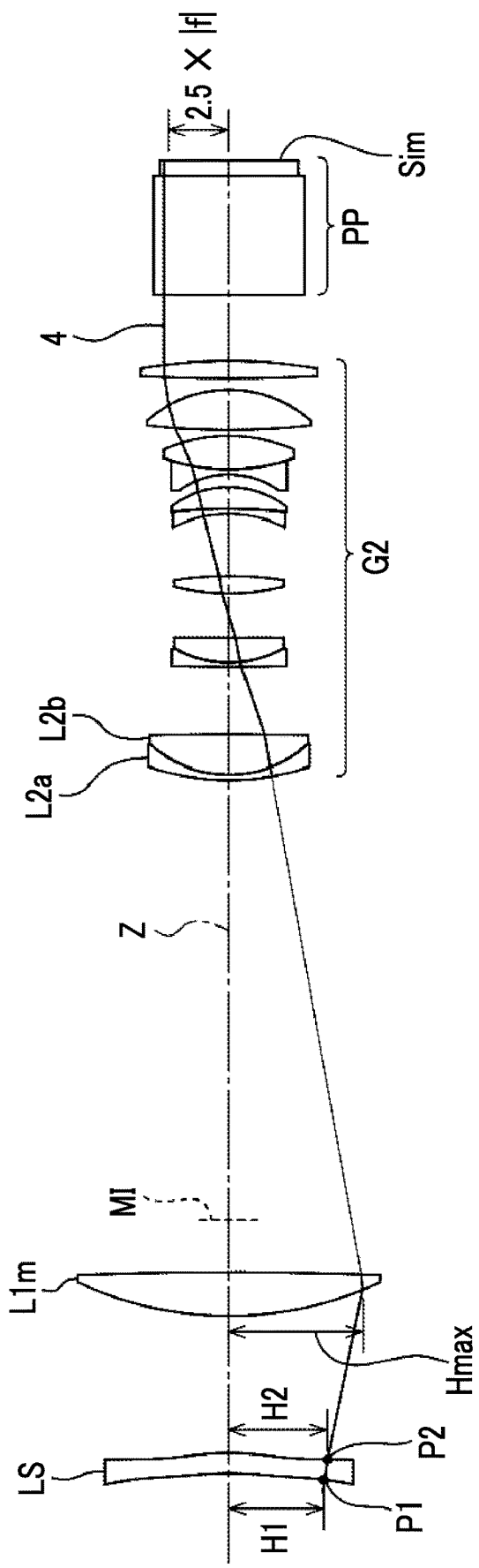
FIG. 3 is a partially enlarged view for explaining H1, H2, and Hmax.

In conditional expressions described later, in a case of defining the local radius of curvature of the specific lens LS, a ray 4, which is incident from the image plane on the reduction side of the image forming optical system 1 into the image forming optical system 1 at a height of 2.5×|f| from the optical axis Z in parallel to the optical axis Z, is used. FIG. 3 shows a partially enlarged view of the image forming optical system 1 into which the ray 4 is incident. In FIG. 3, some reference numerals and aperture stop St are not shown in order to avoid complication of the drawing. As shown in FIG. 3, the intersection of the ray 4 and the magnification side surface of the specific lens LS is set as the point P1, and the intersection of the ray 4 and the reduction side surface of the specific lens LS is set as the point P2. The local radius of curvature at the point P1 is set as Rb1, and the height of the point P1 from the optical axis Z is set as HE The local radius of curvature at the point P2 is set as Rb2, and the height of the point P2 from the optical axis Z is set as H2.

Figure 4:
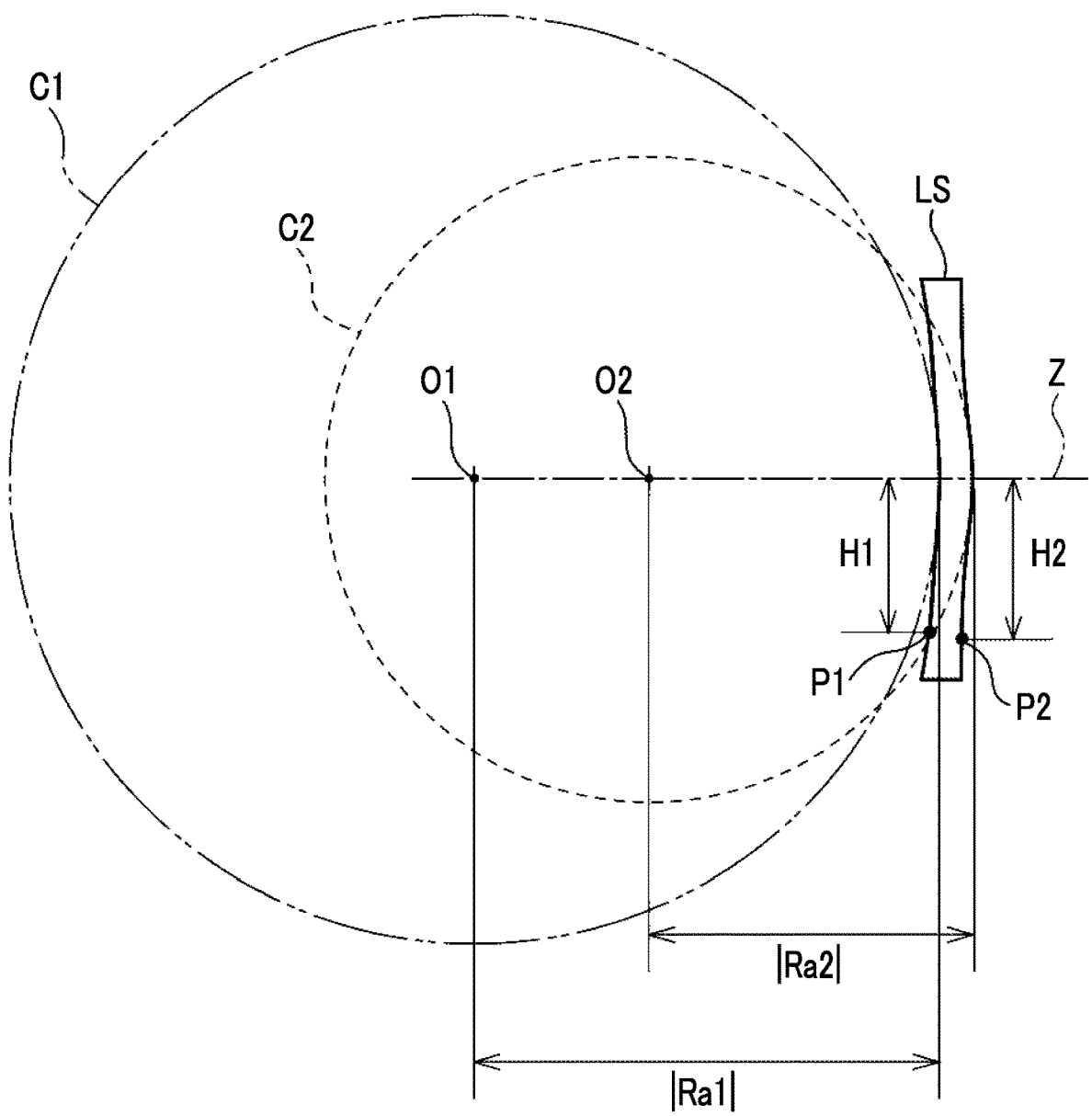
FIG. 4 is a diagram for explaining a surface shape of a specific lens.

FIG. 4 shows a diagram relating to the paraxial radius of curvature Ra1 of the magnification side surface of the specific lens LS of FIG. 1 and the paraxial radius of curvature Ra2 of the reduction side surface of the specific lens LS. In FIG. 4, in order to facilitate understanding, the chain double-dashed line indicates a cross section of a spherical surface C1 having a radius of |Ra1|, having a center O1 on the optical axis Z, and passing through the intersection between the optical axis Z and the magnification side surface of the specific lens LS, and the broken line indicates a cross section of the spherical surface C2 having a radius of |Ra2|, having a center O2 on the optical axis Z, and passing through the intersection between the optical axis Z and the reduction side surface of the specific lens LS. FIG. 4 also shows the above-mentioned points P1, point P2, height H1, and height H2.

As shown in FIG. 4, it is preferable that the magnification side surface of the specific lens LS within a radius |H1| from the optical axis Z is located, outside the optical axis Z, to be closer to the reduction side than a spherical surface C1, and it is preferable that the reduction side surface of the specific lens LS within a radius |H2| from the optical axis Z is located, outside the optical axis Z, to be closer to the reduction side than a spherical surface C2. In such a case, it is advantageous to give the specific lens LS an aspherical surface effect to satisfactorily correct distortion and field curvature. In FIG. 4, H1 is shown only on the lower side of the optical axis Z, but the above-mentioned phrase "within the radius |H1| from the optical axis Z" is not limited to the lower side of the optical axis Z, and means an area in all radial directions. That is, the above-mentioned phrase "the magnification side surface of the specific lens LS within the radius |H1| from the optical axis Z is located, outside the optical axis Z, to be closer to the reduction side than the spherical surface C1" means that the entire area within the radius |H1| from the optical axis Z, from which the point on the optical axis Z is excluded, in the magnification side surface of the specific lens LS is located closer to the reduction side than the spherical surface C1. Similarly, the above-mentioned phrase "the reduction side surface of the specific lens LS within the radius |H2| from the optical axis Z is located, outside the optical axis Z, to be closer to the reduction side than the spherical surface C2" means that the entire area within the radius |H2| from the optical axis Z, from which the point on the optical axis Z is excluded, in the reduction side surface of the specific lens LS is located closer to the reduction side than the spherical surface C2.

The specific lens LS is configured to satisfy Conditional Expressions (3), (4), and (5) with respect to the above-mentioned Ra1, Ra2, Rb1, and Rb2. By satisfying Conditional Expressions (3), (4), and (5), there is an advantage in satisfactorily correcting distortion and field curvature.

$$|Ra1|<|Rb1| \qquad (3),$$

$$|Ra2|<|Rb2| \qquad (4),$$

$$|Rb1|<|Rb2| \qquad (5),$$

Further, the specific lens LS is configured to satisfy Conditional Expression (6) with respect to the above-mentioned Ra1 and H2. By not allowing the result of Conditional Expression (6) to be equal to or less than the lower limit, it is possible to suppress an increase in sensitivity to an error. As a result, there is an advantage in improving manufacturability and assembling property. By not allowing the result of Conditional Expression (6) to be equal to or greater than the upper limit, it is easy to maintain a shape in which the sign of the local radius of curvature is not inverted in the radial direction while obtaining the effect of an aspherical surface. Maintaining the shape is advantageous in improving manufacturability and assembling property. In order to obtain more favorable characteristics, it is more preferable that the specific lens LS satisfies Conditional Expression (6-1), and it is yet more preferable that the specific lens LS satisfies Conditional Expression (6-2).

$$1.65 < |Ra2/H2| < 3 \qquad (6).$$

$$1.75 < |Ra2/H2| < 3 \qquad (6\text{-}1).$$

$$1.95 < |Ra2/H2| < 3 \qquad (6\text{-}2)$$

Regarding the above-mentioned Rb1 and Rb2, it is preferable that the specific lens LS satisfies Conditional Expression (7). By not allowing the result of Conditional Expression (7) to be equal to or less than the lower limit, it is possible to suppress an increase in the wall thickness ratio (that is, the ratio of the thickness of the peripheral portion of the lens to the thickness of the central portion of the lens) and the sensitivity to error. Therefore, there is an advantage in improving manufacturability and assembling property. By not allowing the result of Conditional Expression (7) to be equal to or greater than the upper limit, there is an advantage in obtaining a favorable aberration correction effect while suppressing an increase in the lens diameter. In order to obtain more favorable characteristics, it is more preferable that the specific lens LS satisfies Conditional Expression (7-1).

$$-0.1 < (1/Rb1 - 1/Rb2) \times |f| < -0.015 \qquad (7).$$

$$-0.1 < (1/Rb1 - 1/Rb2) \times |f| < -0.02 \qquad (7\text{-}1).$$

Regarding the above-mentioned H2 and f, it is preferable that the image forming optical system 1 satisfies Conditional Expression (8). By not allowing the result of Conditional Expression (8) to be equal to or less than the lower limit, it is easy to satisfactorily correct distortion and field curvature. By not allowing the result of Conditional Expression (8) to be equal to or greater than the upper limit, it is possible to suppress an increase in the lens diameter. In order to obtain more favorable characteristics, it is more preferable that the image forming optical system 1 satisfies Conditional Expression (8-1), and it is yet more preferable that the image forming optical system 1 satisfies Conditional Expression (8-2).

$$1.35 < |H2/(2.5 \times f)| < 1.8 \qquad (8).$$

$$1.45 < |H2/(2.5 \times f)| < 1.8 \qquad (8\text{-}1).$$

$$1.45 < |H2/(2.5 \times f)| < 1.65 \qquad (8\text{-}2).$$

Further, it is preferable that the image forming optical system 1 satisfies Conditional Expression (9) with respect to the above-mentioned H2 and the Hmax described below. Hmax is a maximum height of heights of the ray 4 from the optical axis Z at two air contact surfaces intersecting the optical axis Z of the lens component closest to the reduction side in the first optical system G1, and heights of the ray 4 from the optical axis Z at two air contact surfaces intersecting the optical axis Z of the lens component closest to the magnification side in the second optical system G2 image forming optical system. Here, one lens component means one cemented lens or one single lens. The two air contact surfaces that intersect the optical axis Z of one lens component are the magnification side surface of the lens component and the reduction side surface of the lens component.

FIG. 3 shows an example of Hmax. In the example of FIG. 3, the maximum height of heights of the ray 4 from the optical axis Z on four surfaces: the magnification side surface of the lens L1m, the reduction side surface of the lens L1m, the magnification side surface of the lens L2a, and the reduction side surface of the lens L2b is Hmax. In the example of FIG. 3, the height of the ray 4 from the optical axis Z on the magnification side surface of the lens L1m is Hmax.

By satisfying Conditional Expression (9), since the specific lens LS does not move excessively far from the intermediate image MI, there is an advantage in satisfactorily correcting distortion and field curvature. Further, by not allowing the result of Conditional Expression (9) to be equal to or greater than the upper limit, it is possible to suppress an increase in the diameter of the lens component closest to the intermediate image MI on the magnification side or the reduction side of the intermediate image MI. In order to obtain more favorable characteristics, it is more preferable that the image forming optical system 1 satisfies Conditional Expression (9-1).

$$1 < |H \max/H2| < 1.8 \qquad (9).$$

$$1 < |H \max/H2| < 1.5 \qquad (9\text{-}1).$$

It is preferable that the image forming optical system 1 is configured to be telecentric on the reduction side. In a projection type display device, spectral characteristics of a color synthesis prism disposed between the image forming optical system 1 and a light valve change depending on an angle of incidence ray. It is desired that the image forming optical system 1 used in combination with the member having the incident angle dependency is configured to be telecentric on the reduction side. Here, the phrase "configured to be telecentric on the reduction side" is not limited to a case where the inclination of the principal ray with respect to the optical axis Z is 0 degree, and an error of −3 degrees or more and +3 degrees or less is allowed. In a case of the optical system that does not include an aperture stop St, in a case where luminous flux are viewed in a direction from the magnification side to the reduction side, the telecentricity may be determined by using, as a substitute for the principal ray, the bisector of the highest ray on the upper side and the lowest ray on the lower side in the cross section of the luminous flux condensed at an optional point on the image plane on the reduction side.

The image forming optical system 1 may be a variable magnification optical system. In a case where the image forming optical system 1 is a variable magnification optical system, all the symbols used in the above-mentioned conditional expression are values at the wide-angle end.

In a case where the image forming optical system 1 is a variable magnification optical system, it is preferable that the image forming optical system 1 is a zoom optical system. In such a case, an optical system having high convenience and general purpose properties can be obtained. In particular, in a case where the image forming optical system 1 is used in the application of a projection optical system, in a projection optical system having a wide angle of view, the size of the projected image caused by an error in the installation distance (that is, the distance between the screen Scr and the projection optical system) fluctuates greatly. Therefore, it is easy to install the system in a case where the system can be adjusted with the zoom. In a case where the image forming optical system 1 is a zoom optical system, the zoom ratio is preferably 1.05 times or more, and more preferably 1.1 times or more.

In a case where the image forming optical system 1 is a zoom optical system, it is preferable that the second optical system G2 is configured to include a lens group that moves during varying a magnification. Since the lens diameter of the second optical system G2 is smaller than that of the first optical system G1 disposed on the magnification side, the load on the drive mechanism is reduced by moving the lens group in the second optical system G2. As a result, there is an advantage in the reduction in size of the device. In addition, the lens group is not limited to a configuration in which the lens group consists of a plurality of lenses, but the lens group may consist of only one lens.

The image forming optical system 1 in the example of FIG. 1 is a zoom lens. As shown in FIG. 1, the second optical system G2 consists of a second A lens group G2A, a second B lens group G2B, and a second C lens group G2C in order from the magnification side to the reduction side. During varying a magnification, the second A lens group G2A and the second B lens group G2B move by changing the mutual spacing, and the first optical system G1 and the second C lens group G2C remain stationary with respect to the image plane. The second A lens group G2A consists of lenses L2a and L2b in order from the magnification side to the reduction side. The second B lens group G2B consists of lenses L2c to L2d, an aperture stop St, and lenses L2e to L2j in this order from the magnification side to the reduction side. The second C lens group G2C consists of a lens L2k. The image forming optical system 1 in FIG. 1 is an example, and in the technique of the present disclosure, the number of lenses included in the first optical system G1 and the second optical system G2 may be different from the number shown in the example shown in FIG. 1.

Further, although FIG. 1 shows an example of an image forming optical system 1 having a linear optical path, the technique of the present disclosure is not limited to this. As shown in a modification example described later, the image forming optical system of the technique of the present disclosure may have a configuration in which an optical path deflection member deflecting at least one optical path is disposed and has a deflected optical path. In the type of system that forms the intermediate image MI, the overall length of the optical system tends to be long, but the device can be compactly configured by deflecting the optical path. As the optical path deflection member, for example, a reflective member such as a reflection mirror can be used.

In a case where the angle at which the optical path is deflected is 90 degrees, it is preferable from the viewpoint of manufacturability and assembling property because it has a simple structure, but the angle may be an angle other than 90 degrees. Further, the case of setting the angle to 90 degrees is not limited to the exact 90 degrees, and an error of −3 degrees or more and +3 degrees or less may be allowed.

The number of times the optical path is deflected can be set optionally. In a case where the number of deflections of the optical path is two, the directions of both deflections of the optical path may be the same, or the directions of the first deflection and the second deflection of the optical path may be opposite to each other. In a case where the optical path is deflected twice, the optical axis Z may be configured to be in the same plane before and after the optical path is deflected, or may be configured to be in different planes.

The "magnification side" and "reduction side" according to the technique of the present disclosure are determined depending on the optical path, and the same applies to an image forming optical system that has a deflected optical path. For example, in the image forming optical system that has a deflected optical path, the phrase "the lens LA is closer to the magnification side than the lens LB" has the same meaning as the phrase "the lens LA is on the optical path to be closer to the magnification side than the lens LB".

All the optical elements having powers included in the image forming optical system 1 may be configured as lenses. All lenses included in the image forming optical system 1 preferably have a refractive index of 2.2 or less at the d line, and more preferably 2 or less in consideration of the availability of current lens materials. The image forming optical system 1 preferably has an F number of 3 or less. In the image forming optical system 1, it is preferable that distortion is suppressed within a range of −3% or more and +3% or less. The image forming optical system 1 preferably has a total angle of view greater than 120 degrees, more preferably greater than 125 degrees, and even more preferably greater than 130 degrees.

The above-mentioned preferred configurations and available configurations including the configurations relating to Conditional Expressions may be any combination, and it is preferable to appropriately selectively adopt the configurations in accordance with required specification. It should be noted that the ranges of the possible conditional expressions are not limited to Conditional Expressions described in the form of the expression, and include ranges obtained through optional combinations of the lower limit and the upper limit are selected from each of the preferable, more preferable, and yet more preferable conditional expressions.

Next, examples and modification examples of the image forming optical system according to the technique of the present disclosure will be described. The reference numerals attached to the lenses in the cross-sectional views of each example are used independently for each example in order to avoid complication of description due to an increase in the number of digits of the reference numerals. Therefore, even in a case where common reference numerals are attached in the drawings of different examples, components do not necessarily have a common configuration.

Example 1

FIG. 1 shows a cross-sectional view of a lens configuration and luminous flux of the image forming optical system 1 according to Example 1. The configuration and the illustration method are as described above, and some redundant parts thereof will not be described. The image forming optical system 1 according to Example 1 is a zoom lens, and consists of a first optical system G1 and a second optical system G2 in order from the magnification side to the reduction side. The intermediate image MI is formed between the first optical system G1 and the second optical system G2. The first optical system G1 consists of lenses L1a to L1m in order from the magnification side to the reduction side. The second optical system G2 consists of a second A lens group G2A, a second B lens group G2B, and a second C lens group G2C in order from the magnification side to the reduction side. During varying a magnification, the second A lens group G2A and the second B lens group G2B move by changing the mutual spacing, and the first optical system G1 and the second C lens group G2C remain stationary with respect to the image plane. The second A lens group G2A consists of lenses L2a and L2b in order from the magnification side to the reduction side. The second B lens group G2B consists of lenses L2c to L2d, an aperture stop St, and lenses L2e to L2j in this order from the magnification side to the reduction side. The second C lens group G2C consists of a lens L2k. During focusing, a focus group consisting of lenses L1e to L1f moves along the optical axis Z, and the other lenses remain stationary with respect to the image plane on the reduction side.

Regarding the image forming optical system 1 of Example 1, Tables 1A and 1B show basic lens data, Table 2 shows specification and variable surface distance, and Table 3 shows aspherical surface coefficients thereof. Here, the basic lens data is divided into two tables, Table 1A and Table 1B, in order to avoid lengthening of one table. Table 1A shows the first optical system G1, and Table 1B shows the second optical system G2 and the optical member PP.

In Tables 1A and 1B, the column of Sn shows surface numbers. The surface closest to the magnification side is the first surface, and the surface numbers increase one by one toward the reduction side. The column of R shows radii of curvature of the respective surfaces. The column of D shows surface distances on the optical axis Z between the respective surfaces and the surfaces adjacent to the reduction side. Further, the column of Nd shows refractive indices of the respective components at the d line, and the column of vd shows Abbe numbers of the respective components based on the d line. The surface in the bottom row of Table 1B corresponds to the image plane on the reduction side.

In Tables 1A and 1B, signs of radii of curvature of surface shapes convex toward the magnification side are set to be positive, and signs of radii of curvature of surface shapes convex toward the reduction side are set to be negative. In Table 1B, in a place of a surface number of a surface corresponding to the aperture stop St, the surface number and a term of (St) are noted. In Table 1B, the symbol DD[ ] is used for each variable surface distance during varying a magnification, and the magnification side surface number of the distance is given in [ ] and is noted in the column D.

In Table 2, regarding the image forming optical system 1, the zoom ratio Zr, the absolute value of the focal length |f|, the F number FNo., the maximum total angle of view of 2ω, and the variable surface distance during varying a magnification are shown based on the d line. (°) in the place of 2ω indicates that the unit thereof is a degree. In Table 2, the columns labeled WIDE and TELE show the values at the wide-angle end and the telephoto end, respectively. The basic lens data and |f| are values in a case where a distance on the optical axis Z from the image plane on the magnification side to the surface closest to the magnification side of the imaging optical system 1 is infinity.

In the basic lens data, the reference sign * is attached to surface numbers of aspherical surfaces, and numerical values of the paraxial radius of curvature are written into the column of the radius of curvature of the aspherical surface. In Table 3, the row of Sn shows surface numbers of the aspherical surfaces, and the rows of KA and Am show numerical values of the aspherical surface coefficients for each aspherical surface. m is an integer of 3 or more. For example, m=3, 4, 5, . . . 20 for the aspherical surfaces of Example 1. The "E±n" (n: an integer) in numerical values of the aspherical surface coefficients of Table 3 indicates "×10$^{±n}$". KA and Am are the aspherical surface coefficients in the aspherical surface expression represented by the following expression.

$$Zd = C \times H^2 / \{1 + (1 - KA \times C^2 \times H^2)^{1/2}\} + \Sigma Am \times H^m$$

Here,

Zd is an aspherical surface depth (a length of a perpendicular from a point on an aspherical surface at height H to a plane that is perpendicular to the optical axis Z and contacts with the vertex of the aspherical surface), H is a height (a distance from the optical axis Z to the lens surface), C is a reciprocal of the paraxial radius of curvature, KA and Am are aspherical surface coefficients, and Σ in the aspherical surface expression means the sum with respect to m.

TABLE 1A

Example 1

| Sn | R | D | Nd | vd |
|---|---|---|---|---|
| *1 | −6.6284 | 1.1212 | 1.53158 | 55.08 |
| *2 | −84.1523 | 0.8303 | | |
| 3 | 10.3688 | 0.3604 | 1.77250 | 49.60 |
| 4 | 4.6543 | 0.8971 | | |
| 5 | 6.4853 | 0.2503 | 1.84666 | 23.78 |
| 6 | 3.7121 | 1.0193 | | |
| 7 | 6.8064 | 0.2202 | 1.77250 | 49.60 |
| 8 | 2.8709 | 3.5750 | | |
| 9 | −4.0765 | 1.3617 | 1.48749 | 70.44 |
| 10 | −14.7311 | 0.0950 | | |
| 11 | −9.6710 | 1.4850 | 1.51742 | 52.43 |
| 12 | −6.2153 | 0.4064 | | |
| 13 | 17.7119 | 1.0010 | 1.80518 | 25.45 |
| 14 | −67.4670 | 0.1001 | | |
| 15 | ∞ | 2.4026 | 1.77250 | 49.60 |
| 16 | −11.8008 | 8.6360 | | |
| 17 | 7.6240 | 2.4963 | 1.49700 | 81.61 |
| 18 | −7.6240 | 0.2603 | 1.84666 | 23.78 |
| 19 | 5.9111 | 3.1627 | 1.59282 | 68.62 |
| 20 | −9.0685 | 0.9015 | | |
| *21 | −11.2155 | 0.8009 | 1.51633 | 64.06 |
| *22 | −7.8084 | 5.3286 | | |
| 23 | 13.7044 | 1.7017 | 1.84666 | 23.78 |
| 24 | −153.9463 | DD[24] | | |

TABLE 1B

Example 1

| Sn | R | D | Nd | vd |
|---|---|---|---|---|
| 25 | 9.6679 | 0.2002 | 1.84666 | 23.78 |
| 26 | 4.4636 | 1.5707 | 1.80610 | 33.27 |
| 27 | −99.8276 | DD[27] | | |
| 28 | 97.0505 | 0.1802 | 1.84666 | 23.78 |
| 29 | 4.2798 | 0.9630 | 1.51633 | 64.14 |
| 30 | ∞ | 1.3725 | | |
| 31(St) | ∞ | 0.3531 | | |
| 32 | 8.8092 | 0.6701 | 1.76182 | 26.52 |
| 33 | −13.7746 | 2.4160 | | |
| 34 | −4.5369 | 0.1802 | 1.71700 | 47.93 |
| 35 | −21.6574 | 0.8410 | 1.65160 | 58.55 |
| 36 | −3.6512 | 0.4890 | | |
| 37 | −3.2573 | 0.2002 | 1.83481 | 42.72 |
| 38 | 7.2958 | 1.3105 | 1.49700 | 81.61 |
| 39 | −6.1809 | 0.2269 | | |
| 40 | 28.5795 | 1.5595 | 1.49700 | 81.54 |
| 41 | −4.7364 | DD[41] | | |
| 42 | 64.7900 | 0.6898 | 1.84666 | 23.78 |
| 43 | −19.4998 | 2.5720 | | |
| 44 | ∞ | 4.6050 | 1.51633 | 64.14 |
| 45 | ∞ | 0.6007 | 1.48749 | 70.44 |
| 46 | ∞ | | | |

TABLE 2

Example 1

| | WIDE | TELE |
|---|---|---|
| Zr | 1.0 | 1.1 |
| |f| | 1.000 | 1.100 |
| FNo. | 2.30 | 2.38 |
| 2ω(°) | 137.2 | 133.6 |
| DD[24] | 19.0617 | 17.7617 |

TABLE 2-continued

Example 1

|  | WIDE | TELE |
|---|---|---|
| DD[27] | 2.6127 | 3.0748 |
| DD[41] | 0.4426 | 1.2805 |

TABLE 3

Example 1

| Sn | 1 | 2 |
|---|---|---|
| KA | −2.25113994612245E−01 | −6.47601359626826E−06 |
| A3 | 4.07820697097093E−02 | 4.56291385703400E−02 |
| A4 | −1.02961158626068E−02 | −1.76829623195184E−02 |
| A5 | 1.21913660244827E−03 | 4.23978747286798E−03 |
| A6 | 7.71434877471797E−04 | −2.03627699473945E−04 |
| A7 | −4.38122087406164E−04 | −1.04380737289444E−04 |
| A8 | 6.69583610052507E−05 | −3.38844702398967E−06 |
| A9 | 1.28900915712556E−05 | 1.09163856110535E−05 |
| A10 | −5.70813217355186E−06 | −2.16282711490742E−06 |
| A11 | 2.76782846533546E−07 | −5.97080831712408E−08 |
| A12 | 1.57589174447525E−07 | 8.77965352699082E−08 |
| A13 | −2.21743036470519E−08 | −1.09363908694566E−08 |
| A14 | −1.63202535191520E−09 | −9.54710531054472E−10 |
| A15 | 4.78713273802462E−10 | 3.35123065819151E−10 |
| A16 | −4.34652847029548E−12 | −9.88266069380760E−12 |
| A17 | −4.60964313942135E−12 | −3.99751461455583E−12 |
| A18 | 2.07643395672007E−13 | 2.91177525631466E−13 |
| A19 | 1.70177902446752E−14 | 1.73111565762657E−14 |
| A20 | −1.11904479182324E−15 | −1.69787371388083E−15 |

| Sn | 21 | 22 |
|---|---|---|
| KA | 1.00000000000000E+00 | 1.00000000000000E+00 |
| A3 | 0.00000000000000E+00 | 7.43261655379117E−19 |
| A4 | 5.00413657325837E−03 | 6.87509251212724E−03 |
| A5 | 6.85153398980399E−04 | −6.08113438489169E−04 |
| A6 | −5.55650257986923E−04 | 4.66212531256906E−04 |
| A7 | −8.97945683841331E−05 | −1.89505283015383E−04 |
| A8 | 6.14882344357291E−05 | −1.21634400771562E−04 |
| A9 | −7.93984313777561E−06 | 5.71021842433635E−05 |
| A10 | −2.71968914947713E−06 | 6.03448951783510E−06 |
| A11 | 2.52223365845534E−06 | −5.50872703116652E−06 |
| A12 | −3.21411840306941E−07 | 7.74239281142069E−08 |
| A13 | −2.28273365273995E−07 | 2.64048631989447E−07 |
| A14 | 4.94146542273399E−08 | −1.58002360123244E−08 |
| A15 | 1.00087639483409E−08 | −6.74095180747535E−09 |
| A16 | −2.63585604000512E−09 | 5.01032254796139E−10 |
| A17 | −2.15597506458187E−10 | 8.61249729908062E−11 |
| A18 | 6.44880989685393E−11 | −5.68711680070542E−12 |
| A19 | 1.82093161166729E−12 | −4.18568787419823E−13 |
| A20 | −6.07314324627465E−13 | 1.19368340709713E−14 |

Figure 5:
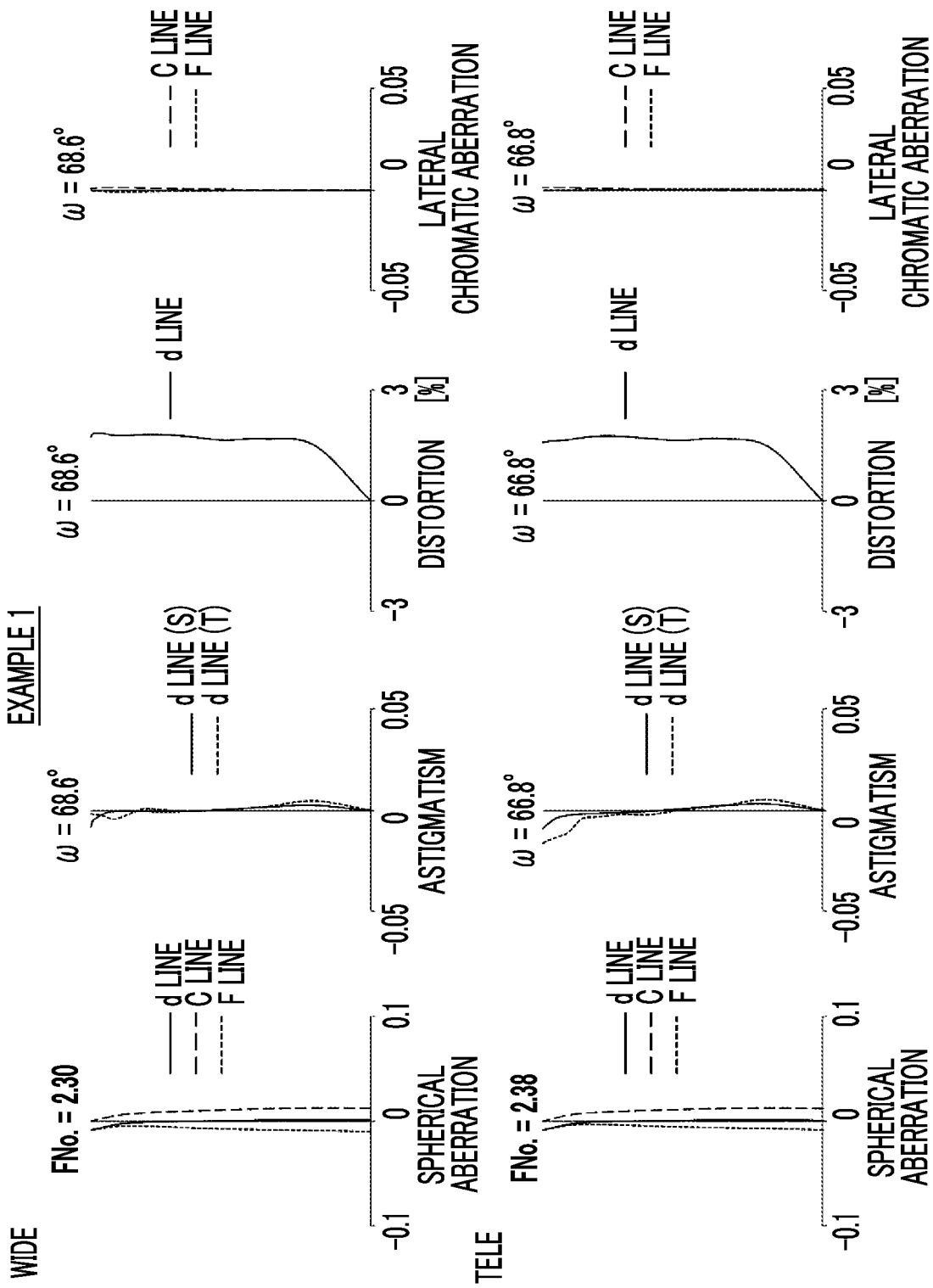
FIG. 5 is an aberration diagram of the image forming optical system according to Example 1.

FIG. 5 shows each aberration diagram of the image forming optical system 1 of Example 1 in a case where the magnification ratio is 150 times. In FIG. 5, the upper row labeled "WIDE" shows aberration diagrams at the wide-angle end, and the lower row labeled "TELE" shows aberration diagrams at the telephoto end. FIG. 5 shows, in order from the left, spherical aberration, astigmatism, distortion, and lateral chromatic aberration. In the spherical aberration diagram, aberrations at the d line, C line, and F line are indicated by the solid line, the long broken line, and the short broken line, respectively. In the astigmatism diagram, the aberration at the d line in the sagittal direction is indicated by a solid line, and the aberration at the d line in the tangential direction is indicated by the short broken line. In the distortion diagram, aberration at the d line is indicated by the solid line. In the lateral chromatic aberration diagram, aberrations at the C line and the F line are indicated by the long broken line and the short broken line, respectively. In the spherical aberration diagram, FNo. indicates an F number. In the other aberration diagrams, w indicates a half angle of view.

It should be noted that each of the above-mentioned tables shows numerical values rounded off to predetermined decimal places. Further, the values in each of the above-mentioned tables are all data in a case where the absolute value of the focal length of the image forming optical system 1 is normalized to be 1 in a state where a distance on the optical axis Z from the image plane on the magnification side to the surface closest to the magnification side of the imaging optical system 1 at the wide-angle end is infinity. Symbols, meanings, description methods, and illustration methods of the respective data pieces according to Example 1 are the same as those in the following examples unless otherwise specified.

First Modification Example

Figure 6:
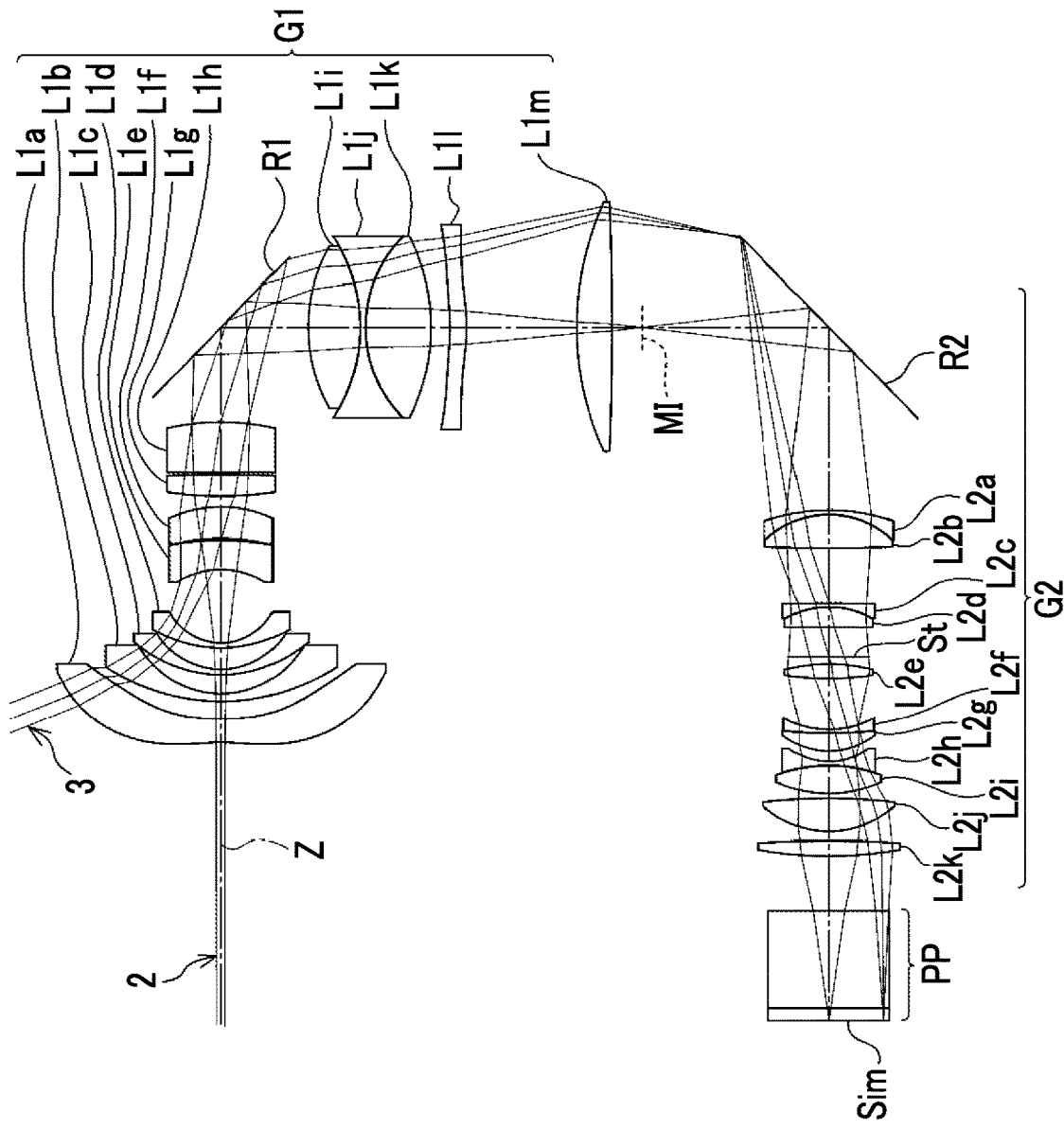
FIG. 6 is a cross-sectional view showing a configuration and luminous flux of an image forming optical system according to a first modification example of Example 1.

FIG. 6 shows a cross-sectional view of a lens configuration and luminous flux of the image forming optical system according to a first modification example. The example of FIG. 6 has a configuration in which two optical path deflection members are added to the image forming optical system of Example 1. In the example of FIG. 6, the reflection mirror R1 and the reflection mirror R2 are used as optical path deflection members, and each mirror deflects the optical path by 90 degrees to form a substantially U-shaped deflected optical path as a whole. The image forming optical system in FIG. 6 consists of a first optical system G1 and a second optical system G2 in order from the magnification side to the reduction side. The first optical system G1 consists of lenses L1a to L1h, a reflection mirror R1, and lenses L1i to L1m in order from the magnification side to the reduction side. The second optical system G2 consists of a reflection mirror R2, lenses L2a to L2d, an aperture stop St, and lenses L2e to L2k in order from the magnification side to the reduction side.

Second Modification Example

Figure 7:
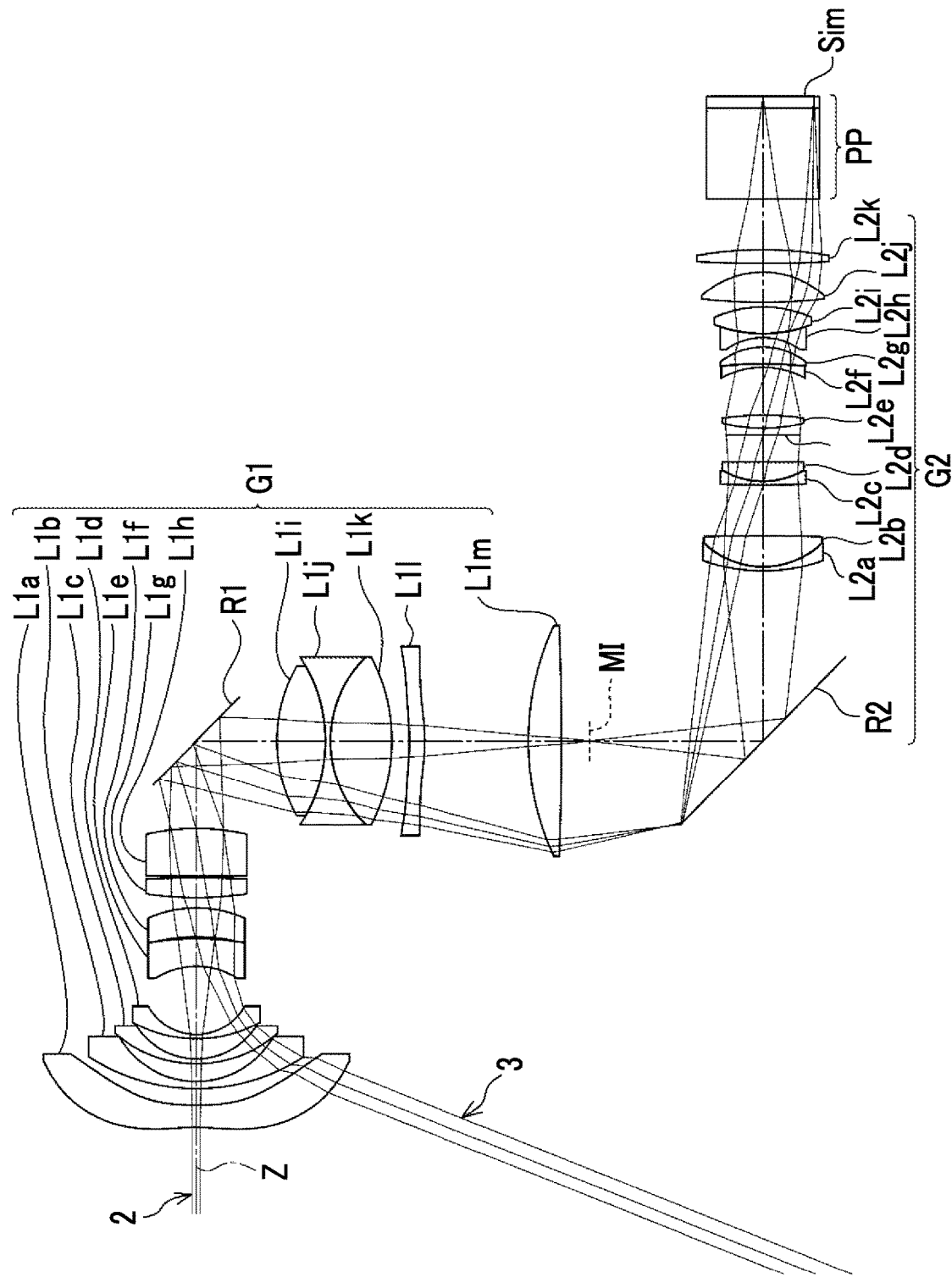
FIG. 7 is a cross-sectional view showing a configuration and luminous flux of an image forming optical system according to a second modification example of Example 1.

FIG. 7 shows a cross-sectional view of a lens configuration and luminous flux of the image forming optical system according to a second modification example. In the example of FIG. 7, the direction in which the optical path of the reflection mirror R2 is deflected is different from that of the example of FIG. 6, and other configurations are the same as those of the example of FIG. 6.

Example 2

Figure 8:
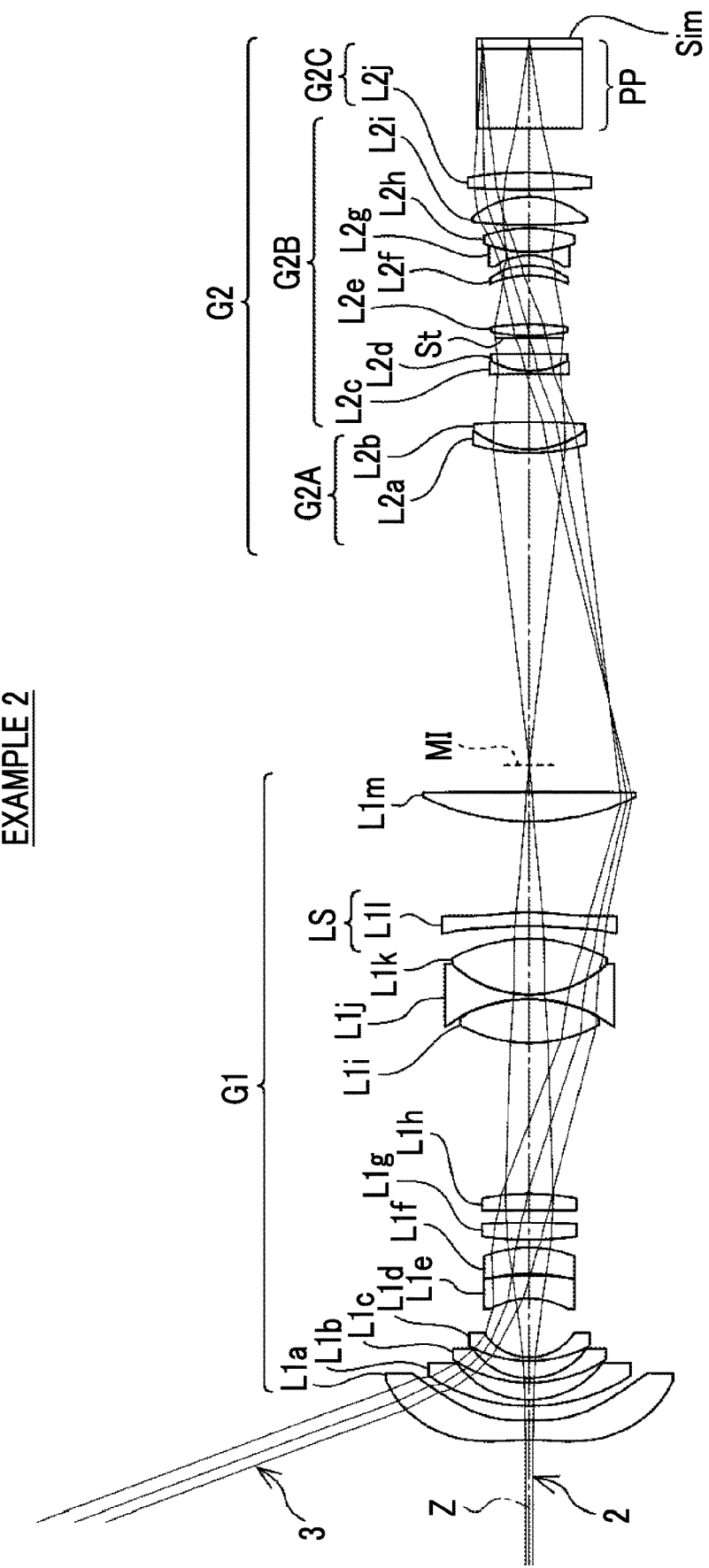
FIG. 8 is a cross-sectional view showing a configuration and luminous flux of an image forming optical system according to Example 2.

FIG. 8 shows a cross-sectional view of a lens configuration and luminous flux of the image forming optical system according to Example 2. The image forming optical system according to Example 2 is a zoom lens, and consists of a first optical system G1 and a second optical system G2 in order from the magnification side to the reduction side. The intermediate image MI is formed between the first optical system G1 and the second optical system G2. The first optical system G1 consists of lenses L1a to L1m in order from the magnification side to the reduction side. The second optical system G2 consists of a second A lens group G2A, a second B lens group G2B, and a second C lens group G2C in order from the magnification side to the reduction side. During varying a magnification, the second A lens group G2A and the second B lens group G2B move by changing the mutual spacing, and the first optical system G1 and the second C lens group G2C remain stationary with respect to the image plane. The second A lens group G2A consists of lenses L2a and L2b in order from the magnification side to the reduction side. The second B lens group G2B consists of lenses L2c to L2d, an aperture stop St, and lenses L2e to L2i in this order from the magnification side to the reduction side. The second C lens group G2C consists of the lens L2j. During focusing, a focus group consisting of lenses L1e to L1f moves along the optical axis Z, and the other lenses remain stationary with respect to the image plane on the reduction side.

Figure 9:
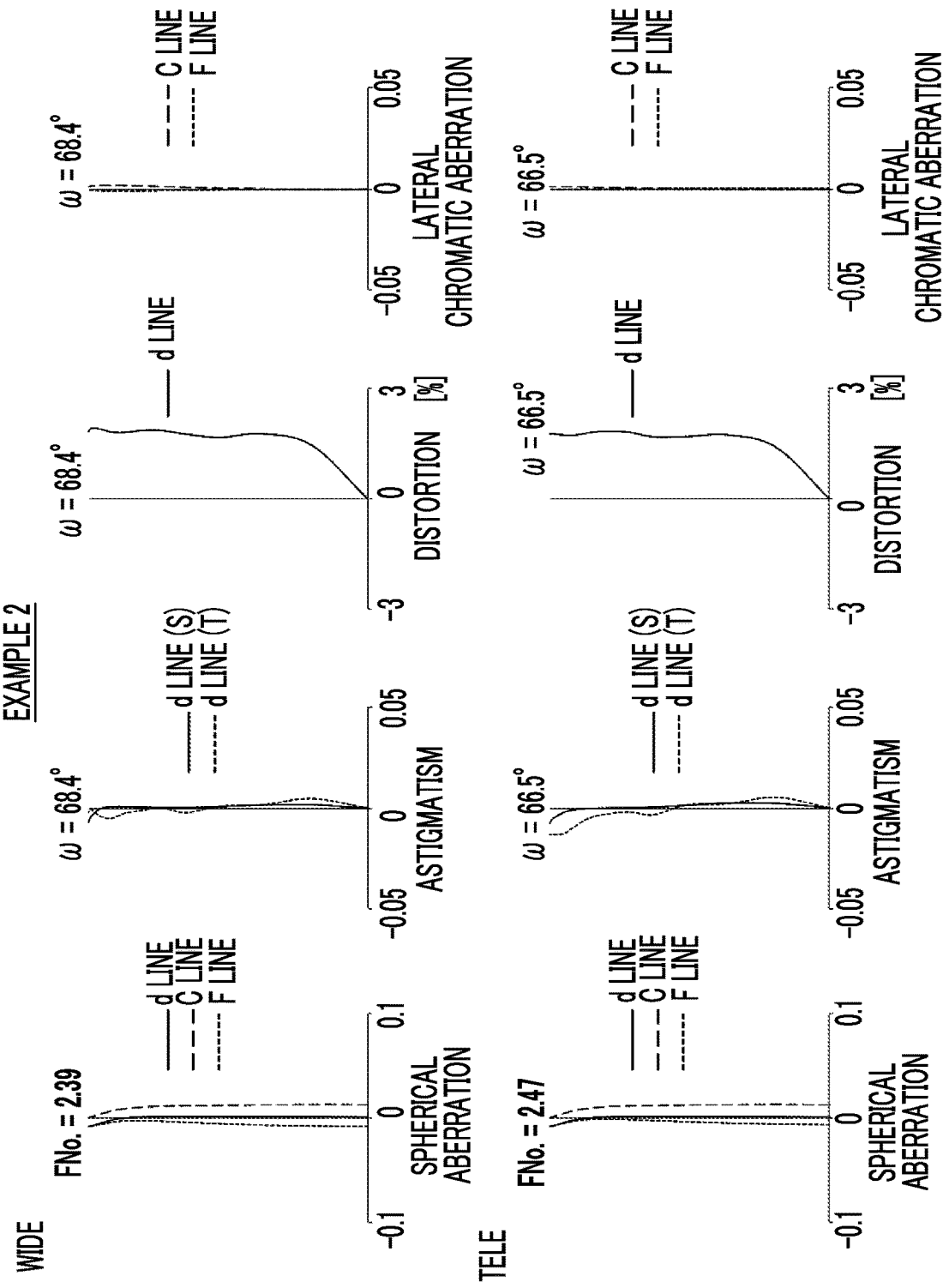
FIG. 9 is an aberration diagram of the image forming optical system according to Example 2.

Regarding the image forming optical system of Example 2, Tables 4A and 4B show the basic lens data, Table 5 shows specification and variable surface distances, Table 6 shows aspherical surface coefficients thereof, and FIG. 9 shows aberration diagrams in a case where the magnification ratio is 150 times.

TABLE 4A

Example 2

| Sn | R | D | Nd | vd |
|---|---|---|---|---|
| *1 | −6.8855 | 1.1207 | 1.53158 | 55.08 |
| *2 | −116.6671 | 0.8436 | | |
| 3 | 9.6495 | 0.3602 | 1.77250 | 49.60 |
| 4 | 4.8145 | 0.9983 | | |
| 5 | 7.2425 | 0.2502 | 1.84666 | 23.78 |
| 6 | 3.6787 | 1.0012 | | |
| 7 | 6.6646 | 0.2201 | 1.77250 | 49.60 |
| 8 | 2.9050 | 3.4082 | | |
| 9 | −4.0598 | 1.3636 | 1.48749 | 70.44 |
| 10 | −13.5331 | 0.0821 | | |
| 11 | −9.7629 | 1.4920 | 1.51742 | 52.43 |
| 12 | −6.3859 | 0.4480 | | |
| 13 | 17.7308 | 0.9969 | 1.80518 | 25.45 |
| 14 | −63.0826 | 0.7237 | | |
| 15 | ∞ | 0.9640 | 1.77250 | 49.60 |
| 16 | −11.8063 | 8.7657 | | |
| 17 | 7.5722 | 2.5109 | 1.49700 | 81.61 |
| 18 | −7.5722 | 0.2602 | 1.84666 | 23.78 |
| 19 | 5.9857 | 3.2424 | 1.59282 | 68.62 |
| 20 | −8.6865 | 0.7441 | | |
| *21 | −14.2751 | 0.8005 | 1.51633 | 64.06 |
| *22 | −9.4643 | 5.2866 | | |
| 23 | 12.8331 | 1.6965 | 1.84666 | 23.78 |
| 24 | −2161.2830 | DD[24] | | |

TABLE 4B

Example 2

| Sn | R | D | Nd | vd |
|---|---|---|---|---|
| 25 | 10.7580 | 0.2001 | 1.84666 | 23.78 |
| 26 | 4.8489 | 1.5972 | 1.80610 | 33.27 |
| 27 | −41.8260 | DD[27] | | |
| 28 | −69.1947 | 0.1801 | 1.84666 | 23.78 |
| 29 | 4.1228 | 0.9922 | 1.51633 | 64.14 |
| 30 | ∞ | 0.9241 | | |
| 31(St) | ∞ | 0.1205 | | |
| 32 | 9.3787 | 0.6609 | 1.80518 | 25.42 |
| 33 | −14.7696 | 2.8534 | | |
| 34 | −5.0032 | 0.5421 | 1.71300 | 53.87 |
| 35 | −3.7019 | 0.5905 | | |
| 36 | −3.1420 | 0.2001 | 1.79952 | 42.22 |
| 37 | 6.6287 | 1.3838 | 1.49700 | 81.61 |
| 38 | −7.2179 | 0.1853 | | |
| 39 | 27.1496 | 1.6390 | 1.49700 | 81.54 |
| 40 | −4.7038 | DD[40] | | |
| 41 | 53.6276 | 1.0001 | 1.84666 | 23.78 |
| 42 | −19.7826 | 2.5705 | | |

TABLE 4B-continued

Example 2

| Sn | R | D | Nd | vd |
|---|---|---|---|---|
| 43 | ∞ | 4.6031 | 1.51633 | 64.14 |
| 44 | ∞ | 0.6004 | 1.48749 | 70.44 |
| 45 | ∞ | | | |

TABLE 5

Example 2

| | WIDE | TELE |
|---|---|---|
| Zr | 1.0 | 1.1 |
| \|f\| | 1.000 | 1.100 |
| FNo. | 2.39 | 2.47 |
| 2ω(°) | 136.8 | 133.0 |
| DD[24] | 19.5952 | 18.3401 |
| DD[27] | 2.7914 | 3.2528 |
| DD[40] | 0.4142 | 1.2079 |

TABLE 6

Example 2

| Sn | 1 | 2 |
|---|---|---|
| KA | −8.30027821569107E−01 | −5.00000005665530E+00 |
| A3 | 2.86937489077105E−02 | 2.96265447374858E−02 |
| A4 | −3.29992974657717E−03 | −5.86841467348837E−03 |
| A5 | 8.16601215301301E−04 | 2.46120301873704E−03 |
| A6 | −3.11271928059041E−05 | −1.03446165478823E−03 |
| A7 | −2.37480189728121E−04 | 1.06690256892135E−04 |
| A8 | 8.75434319592270E−05 | 5.45219594290493E−05 |
| A9 | −3.26931365442002E−08 | −9.27055924220208E−06 |
| A10 | −5.02107092597380E−06 | −2.99680430278195E−06 |
| A11 | 6.06446805309123E−07 | 6.39987908640128E−07 |
| A12 | 1.10017138503887E−07 | 7.33389489836210E−08 |
| A13 | −2.45318756811168E−08 | −2.13380644352866E−08 |
| A14 | −6.79255921967215E−10 | −6.23749194759365E−10 |
| A15 | 4.33089041373058E−10 | 3.66685920340150E−10 |
| A16 | −1.12175874171959E−11 | −4.78959384998437E−12 |
| A17 | −3.68850843872321E−12 | −3.19720138191849E−12 |
| A18 | 1.98497326488603E−13 | 1.22869638460357E−13 |
| A19 | 1.23766649646723E−14 | 1.11476203073967E−14 |
| A20 | −8.82300284285872E−16 | −6.15558109261630E−16 |

| Sn | 23 | 24 |
|---|---|---|
| KA | 1.00000000000000E+00 | 1.00000000000000E+00 |
| A3 | −4.18881105695739E−19 | 1.25646409406062E−18 |
| A4 | 4.07855070799401E−03 | 6.17611783963509E−03 |
| A5 | −8.47002334647723E−04 | −1.92323800389436E−03 |
| A6 | 3.29209729555419E−04 | 8.29178393432841E−04 |
| A7 | 1.30322403569717E−04 | 1.92248332971358E−04 |
| A8 | −1.44310372310190E−04 | −2.46344603563535E−04 |
| A9 | −1.61671131618798E−05 | 3.79287751556682E−06 |
| A10 | 2.08152222627235E−05 | 2.56224505379419E−05 |
| A11 | 1.58458907925285E−06 | −1.27716691013976E−06 |
| A12 | −1.83389583887279E−06 | −1.61734856826677E−06 |
| A13 | −1.10141090452668E−07 | 6.27141010605085E−08 |
| A14 | 1.05529039250712E−07 | 7.10417208242781E−08 |
| A15 | 4.57150399496241E−09 | −1.05311309294541E−09 |
| A16 | −3.78533494274017E−09 | −2.13601817684698E−09 |
| A17 | −9.79005535273583E−11 | −1.83629693992993E−12 |
| A18 | 7.55539095394374E−11 | 3.82847081286521E−11 |
| A19 | 8.23236920341447E−13 | 1.54631236610245E−13 |
| A20 | −6.35087931229575E−13 | −2.98739191017816E−13 |

Example 3

Figure 10:
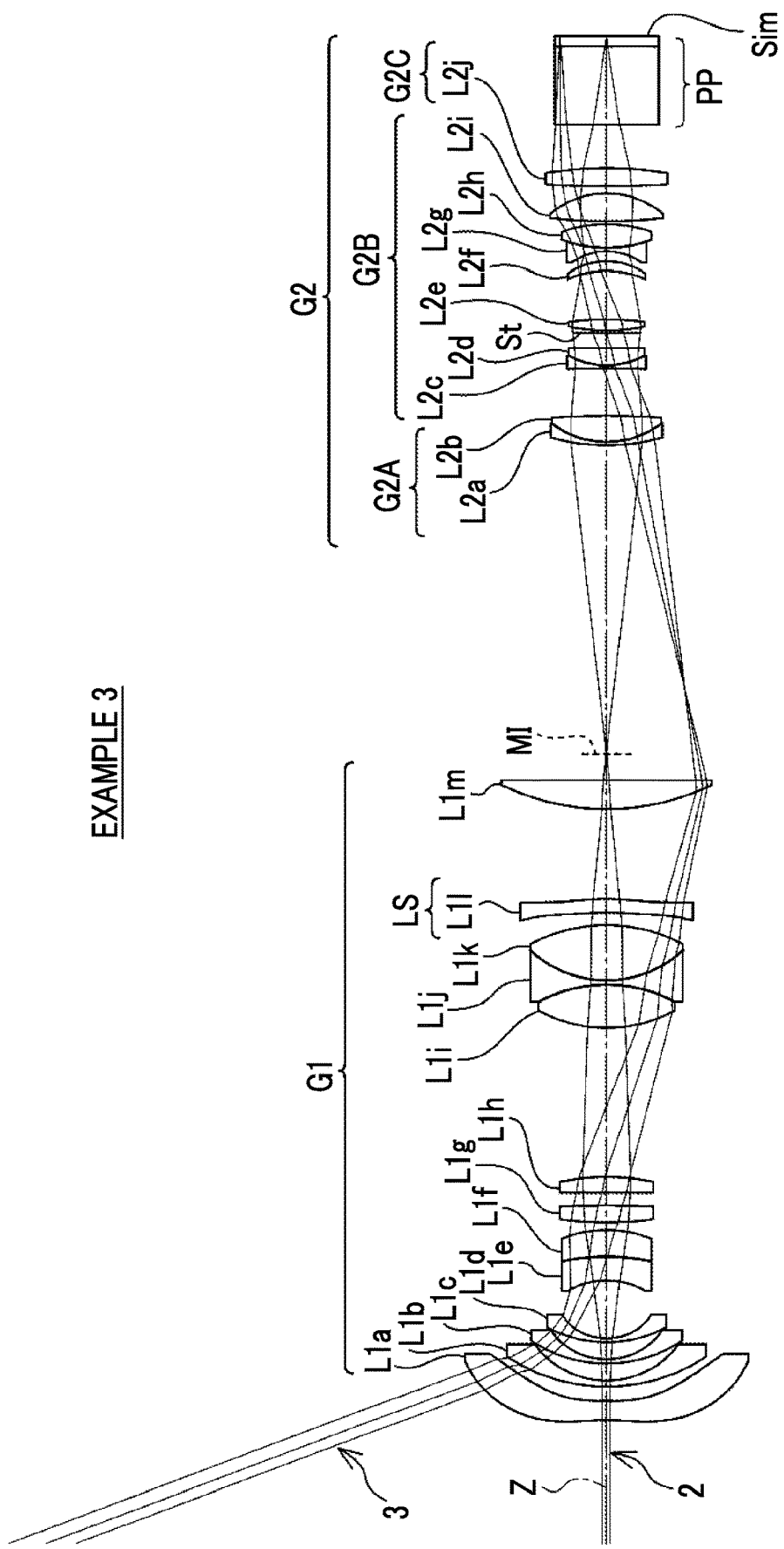
FIG. 10 is a cross-sectional view showing a configuration and luminous flux of an image forming optical system according to Example 3.

FIG. 10 shows a cross-sectional view of a lens configuration and luminous flux of the image forming optical system according to Example 3. The image forming optical system according to Example 3 is a zoom lens, and consists of a first optical system G1 and a second optical system G2 in order from the magnification side to the reduction side. The intermediate image MI is formed between the first optical system G1 and the second optical system G2. The first optical system G1 consists of lenses L1a to L1m in order from the magnification side to the reduction side. The second optical system G2 consists of a second A lens group G2A, a second B lens group G2B, and a second C lens group G2C in order from the magnification side to the reduction side. During varying a magnification, the second A lens group G2A and the second B lens group G2B move by changing the mutual spacing, and the first optical system G1 and the second C lens group G2C remain stationary with respect to the image plane. The second A lens group G2A consists of lenses L2a and L2b in order from the magnification side to the reduction side. The second B lens group G2B consists of lenses L2c to L2d, an aperture stop St, and lenses L2e to L2i in this order from the magnification side to the reduction side. The second C lens group G2C consists of the lens L2j. During focusing, a focus group consisting of lenses L1e to L1f moves along the optical axis Z, and the other lenses remain stationary with respect to the image plane on the reduction side.

Figure 11:
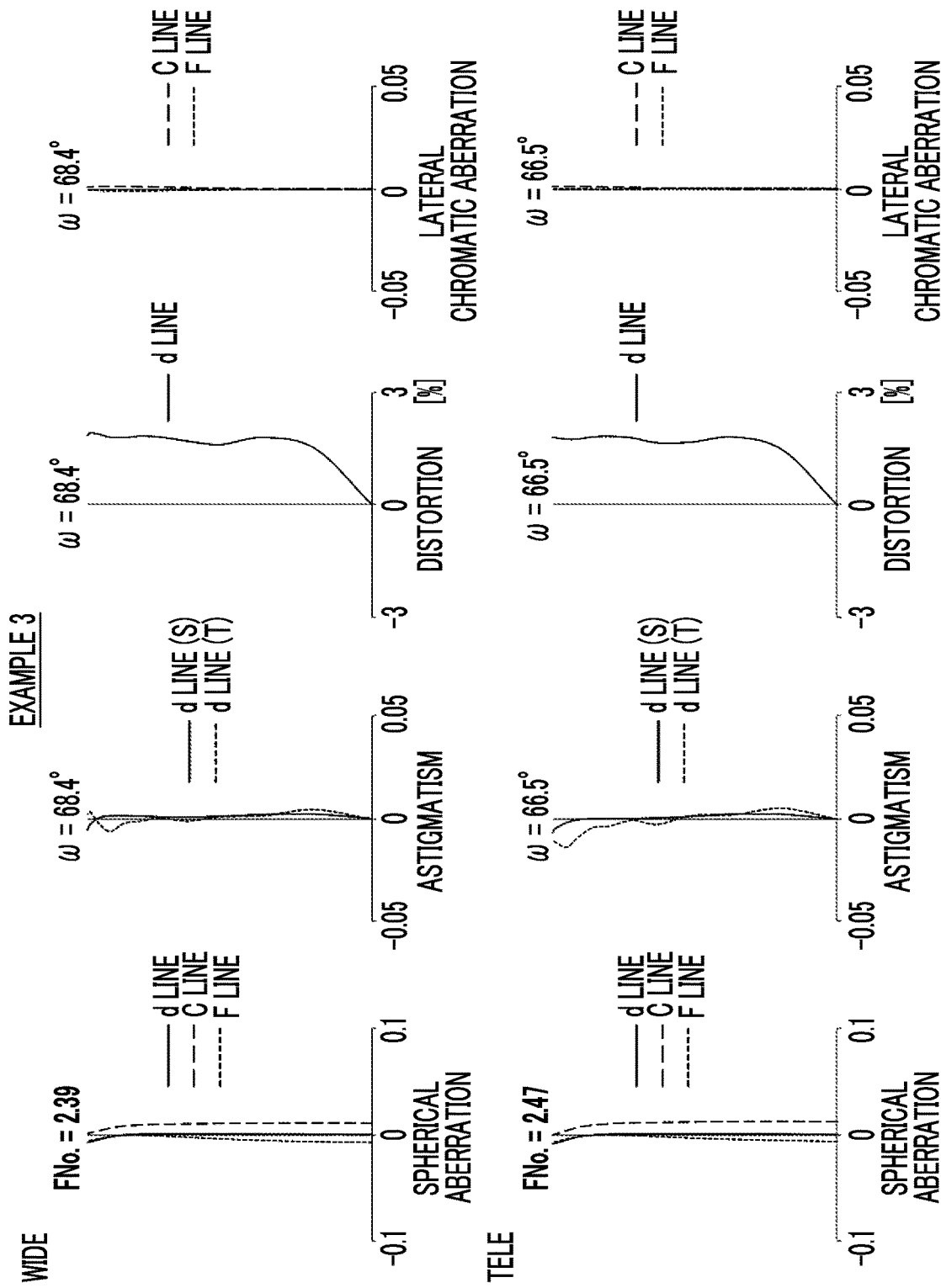
FIG. 11 is an aberration diagram of the image forming optical system according to Example 3.

Regarding the image forming optical system of Example 3, Tables 7A and 7B show the basic lens data, Table 8 shows specification and variable surface distances, Table 9 shows aspherical surface coefficients thereof, and FIG. 11 shows aberration diagrams in a case where the magnification ratio is 150 times.

TABLE 7A

Example 3

| Sn | R | D | Nd | vd |
|---|---|---|---|---|
| *1 | −6.8896 | 1.1208 | 1.53158 | 55.08 |
| *2 | −115.9852 | 0.8488 | | |
| 3 | 9.6318 | 0.3603 | 1.77250 | 49.60 |
| 4 | 4.8172 | 0.9955 | | |
| 5 | 7.2434 | 0.2502 | 1.84666 | 23.78 |
| 6 | 3.6775 | 1.0029 | | |
| 7 | 6.6702 | 0.2202 | 1.77250 | 49.60 |
| 8 | 2.9042 | 3.4089 | | |
| 9 | −4.0577 | 1.3618 | 1.48749 | 70.44 |
| 10 | −13.5204 | 0.0819 | | |
| 11 | −9.7773 | 1.4911 | 1.51742 | 52.43 |
| 12 | −6.3920 | 0.4484 | | |
| 13 | 17.6262 | 1.0004 | 1.80518 | 25.45 |
| 14 | −64.0709 | 0.7458 | | |
| 15 | ∞ | 0.9356 | 1.77250 | 49.60 |
| 16 | −11.8235 | 8.7708 | | |
| 17 | 7.5776 | 2.5095 | 1.49700 | 81.61 |
| 18 | −7.5776 | 0.2602 | 1.84666 | 23.78 |
| 19 | 5.9843 | 3.2402 | 1.59282 | 68.62 |
| 20 | −8.6573 | 0.7438 | | |
| *21 | −14.2617 | 0.8006 | 1.51633 | 64.06 |
| *22 | −9.4806 | 5.2899 | | |
| 23 | 12.7876 | 1.6962 | 1.84666 | 23.78 |
| 24 | ∞ | DD[24] | | |

TABLE 7B

Example 3

| Sn | R | D | Nd | vd |
|---|---|---|---|---|
| 25 | 10.7425 | 0.2001 | 1.84666 | 23.78 |
| 26 | 4.8597 | 1.5346 | 1.80610 | 33.27 |
| 27 | −41.2062 | DD[27] | | |

TABLE 7B-continued

Example 3

| Sn | R | D | Nd | vd |
|---|---|---|---|---|
| 28 | −67.9167 | 0.1801 | 1.84666 | 23.78 |
| 29 | 4.1247 | 1.0073 | 1.51633 | 64.14 |
| 30 | ∞ | 0.9006 | | |
| 31(St) | ∞ | 0.1363 | | |
| 32 | 9.4289 | 0.6434 | 1.80518 | 25.42 |
| 33 | −14.8126 | 2.8544 | | |
| 34 | −4.9948 | 0.5411 | 1.71300 | 53.87 |
| 35 | −3.7011 | 0.5904 | | |
| 36 | −3.1425 | 0.2001 | 1.79952 | 42.22 |
| 37 | 6.6324 | 1.3907 | 1.49700 | 81.61 |
| 38 | −7.1929 | 0.1769 | | |
| 39 | 27.0480 | 1.6356 | 1.49700 | 81.54 |
| 40 | −4.7036 | DD[40] | | |
| 41 | 53.4429 | 1.0687 | 1.84666 | 23.78 |
| 42 | −19.7608 | 2.5674 | | |
| 43 | ∞ | 4.6032 | 1.51633 | 64.14 |
| 44 | ∞ | 0.6004 | 1.48749 | 70.44 |
| 45 | ∞ | | | |

TABLE 8

Example 3

| | WIDE | TELE |
|---|---|---|
| Zr | 1.0 | 1.1 |
| |f| | 1.000 | 1.100 |
| FNo. | 2.39 | 2.47 |
| 2ω(°) | 136.8 | 133.0 |
| DD[24] | 19.5897 | 18.3388 |
| DD[27] | 2.7933 | 3.2513 |
| DD[40] | 0.4156 | 1.2085 |

TABLE 9

Example 3

| Sn | 1 | 2 |
|---|---|---|
| KA | −8.32134248148113E−01 | −5.00000611834901E+00 |
| A3 | 2.90677620147017E−02 | 3.01974176150159E−02 |
| A4 | −3.26941833062451E−03 | −6.02494815967902E−03 |
| A5 | 7.22587436512917E−04 | 2.38007561087221E−03 |
| A6 | −3.82225870559143E−05 | −1.01060616874497E−03 |
| A7 | −2.26072998546171E−04 | 1.11136922306827E−04 |
| A8 | 8.85519332888574E−05 | 5.36471861279951E−05 |
| A9 | −1.04142912197001E−06 | −9.35123103229330E−06 |
| A10 | −5.04664662066249E−06 | −3.02628290060371E−06 |
| A11 | 6.57825746912823E−07 | 6.37919253518892E−07 |
| A12 | 1.08751353455239E−07 | 7.67069208536808E−08 |
| A13 | −2.60050102443747E−08 | −2.12171938589964E−08 |
| A14 | −5.96274344825609E−10 | −7.37579764474334E−10 |
| A15 | 4.56709802068118E−10 | 3.64474983980394E−10 |
| A16 | −1.30343904157748E−11 | −2.87260515001081E−12 |
| A17 | −3.88652832533741E−12 | −3.17886639644375E−12 |
| A18 | 2.16551849912005E−13 | 1.06509140686731E−13 |
| A19 | 1.30530262721347E−14 | 1.10897221183732E−14 |
| A20 | −9.51088996289576E−16 | −5.59102954685875E−16 |

| Sn | 21 | 22 |
|---|---|---|
| KA | 1.00000000000000E+00 | 1.00000000000000E+00 |
| A3 | 8.38082190789966E−19 | −2.38871709869917E−18 |
| A4 | 4.82627093873977E−03 | 7.04083511945269E−03 |
| A5 | −1.20937872377020E−03 | −2.51063298603793E−03 |
| A6 | 7.95641419412736E−05 | 7.46364597777118E−04 |
| A7 | 2.84968430234922E−04 | 3.31911248558360E−04 |
| A8 | −1.09632962890329E−04 | −2.54349717214323E−04 |
| A9 | −4.55314482686805E−05 | −1.04625077116178E−05 |
| A10 | 1.91425294953281E−05 | 2.75618903368725E−05 |
| A11 | 4.58766200058006E−06 | −5.84612358464615E−07 |

TABLE 9-continued

Example 3

| | | |
|---|---|---|
| A12 | −1.90796459779882E−06 | −1.74877251955991E−06 |
| A13 | −2.87482219103590E−07 | 5.05210756562753E−08 |
| A14 | 1.18144385380296E−07 | 7.45493765842238E−08 |
| A15 | 1.06283384139496E−08 | −1.27234127354267E−09 |
| A16 | −4.39233163726374E−09 | −2.13884839458125E−09 |
| A17 | −2.09059134002855E−10 | 9.79437020707889E−12 |
| A18 | 8.88505342705927E−11 | 3.67669068741630E−11 |
| A19 | 1.67193512333768E−12 | 2.83220997221260E−14 |
| A20 | −7.48079430326800E−13 | −2.78919639793520E−13 |

Example 4

Figure 12:
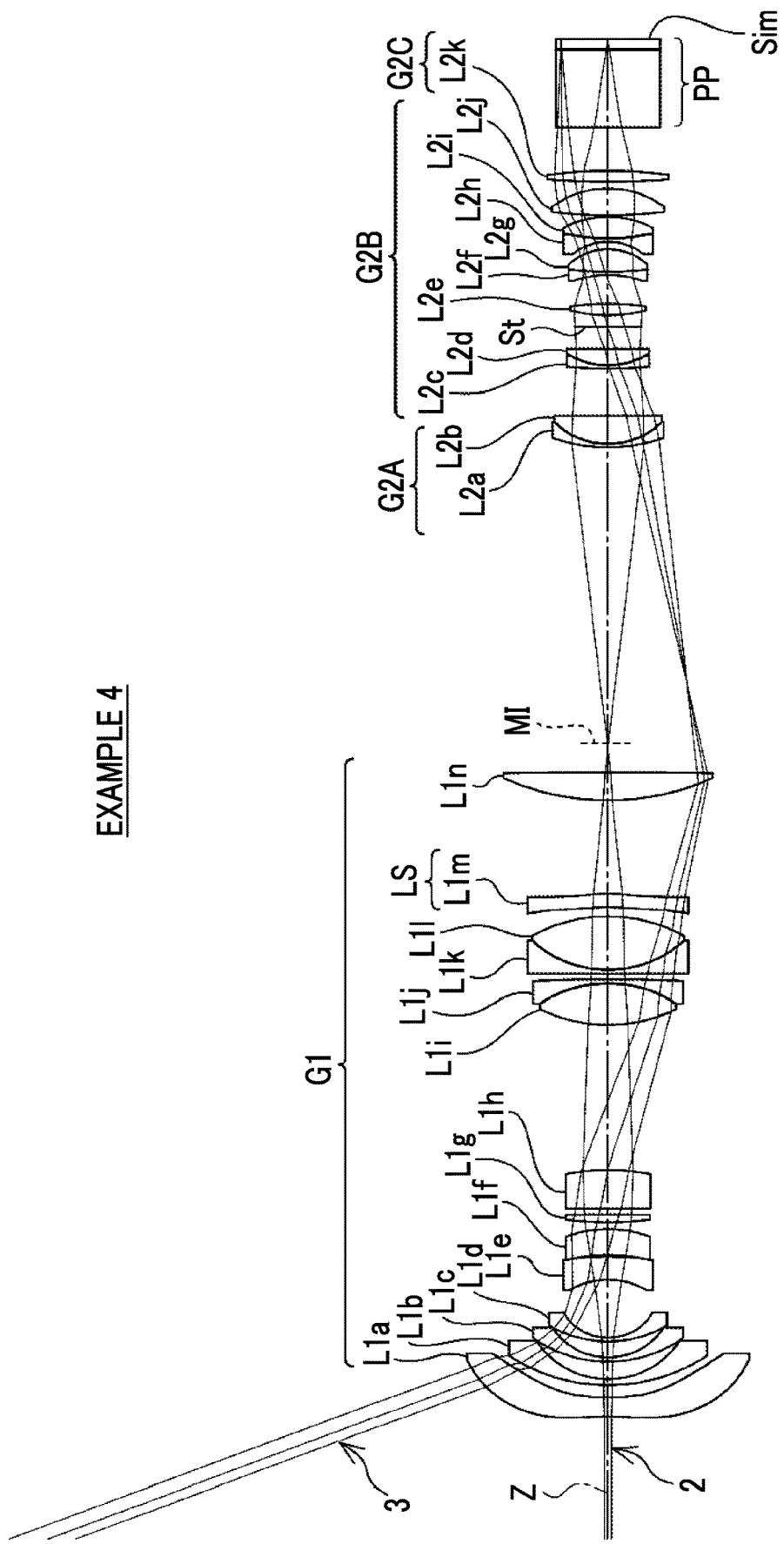
FIG. 12 is a cross-sectional view showing a configuration and luminous flux of an image forming optical system according to Example 4.

FIG. 12 shows a cross-sectional view of a lens configuration and luminous flux of the image forming optical system according to Example 4. The image forming optical system according to Example 4 is a zoom lens, and consists of a first optical system G1 and a second optical system G2 in order from the magnification side to the reduction side. The intermediate image MI is formed between the first optical system G1 and the second optical system G2. The first optical system G1 consists of lenses L1a to L1n in order from the magnification side to the reduction side. The second optical system G2 consists of a second A lens group G2A, a second B lens group G2B, and a second C lens group G2C in order from the magnification side to the reduction side. During varying a magnification, the second A lens group G2A and the second B lens group G2B move by changing the mutual spacing, and the first optical system G1 and the second C lens group G2C remain stationary with respect to the image plane. The second A lens group G2A consists of lenses L2a and L2b in order from the magnification side to the reduction side. The second B lens group G2B consists of lenses L2c to L2d, an aperture stop St, and lenses L2e to L2j in this order from the magnification side to the reduction side. The second C lens group G2C consists of a lens L2k. During focusing, a focus group consisting of lenses L1e to L1f moves along the optical axis Z, and the other lenses remain stationary with respect to the image plane on the reduction side.

Figure 13:
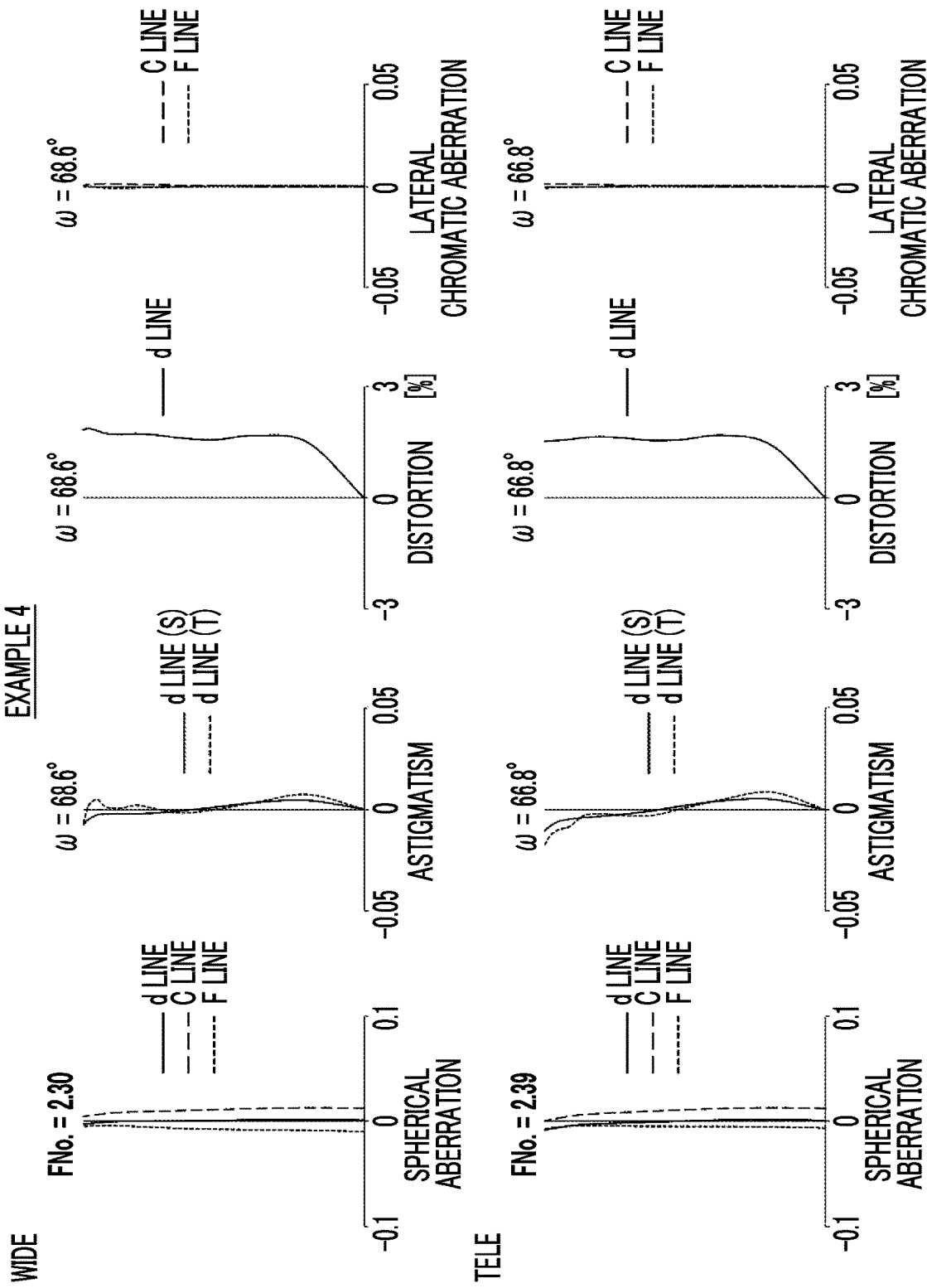
FIG. 13 is an aberration diagram of the image forming optical system according to Example 4.

Regarding the image forming optical system of Example 4, Tables 10A and 10B show the basic lens data, Table 11 shows specification and variable surface distances, Table 12 shows aspherical surface coefficients thereof, and FIG. 13 shows aberration diagrams in a case where the magnification ratio is 150 times.

TABLE 10A

Example 4

| Sn | R | D | Nd | vd |
|---|---|---|---|---|
| *1 | −6.5174 | 1.1220 | 1.53158 | 55.08 |
| *2 | −80.9120 | 0.7204 | | |
| 3 | 9.7069 | 0.3607 | 1.77250 | 49.62 |
| 4 | 4.6728 | 1.0349 | | |
| 5 | 7.0426 | 0.2505 | 1.84666 | 23.78 |
| 6 | 3.6305 | 0.9412 | | |
| 7 | 6.2331 | 0.2204 | 1.77250 | 49.62 |
| 8 | 2.8379 | 3.4364 | | |
| 9 | −3.9908 | 1.3742 | 1.48749 | 70.42 |
| 10 | −14.5015 | 0.0866 | | |
| 11 | −9.7024 | 1.5084 | 1.51742 | 52.19 |
| 12 | −6.2157 | 0.4074 | | |
| 13 | 17.0987 | 0.4537 | 1.80518 | 25.46 |
| 14 | −77.2644 | 0.3481 | | |
| 15 | ∞ | 2.2927 | 1.77249 | 49.58 |

TABLE 10A-continued

Example 4

| Sn | R | D | Nd | vd |
|---|---|---|---|---|
| 16 | −11.5920 | 8.5350 | | |
| 17 | 8.1972 | 2.4164 | 1.49700 | 81.61 |
| 18 | −6.8302 | 0.2605 | 1.84666 | 23.78 |
| 19 | −84.5777 | 0.3106 | | |
| 20 | ∞ | 0.2505 | 1.84666 | 23.78 |
| 21 | 6.1517 | 3.1537 | 1.59282 | 68.62 |
| 22 | −8.4172 | 0.5510 | | |
| *23 | −10.5813 | 0.8015 | 1.51649 | 64.00 |
| *24 | −8.0156 | 5.5260 | | |
| 25 | 13.7089 | 1.6570 | 1.84666 | 23.79 |
| 26 | −257.5877 | DD[26] | | |

TABLE 10B

Example 4

| Sn | R | D | Nd | vd |
|---|---|---|---|---|
| 27 | 9.0401 | 0.2004 | 1.84666 | 23.78 |
| 28 | 4.1389 | 1.6670 | 1.80610 | 33.27 |
| 29 | ∞ | DD[29] | | |
| 30 | 28.0617 | 0.1803 | 1.84666 | 23.79 |
| 31 | 4.0750 | 0.0210 | | |
| 32 | 4.2124 | 0.9617 | 1.51680 | 64.21 |
| 33 | ∞ | 1.3164 | | |
| 34(St) | ∞ | 0.6612 | | |
| 35 | 7.4977 | 0.6973 | 1.80518 | 25.45 |
| 36 | −12.8277 | 1.7011 | | |
| 37 | −5.2953 | 0.1803 | 1.91083 | 35.26 |
| 38 | 16.5075 | 0.0262 | | |
| 39 | 21.5621 | 1.2743 | 1.48749 | 70.42 |
| 40 | −3.1501 | 0.4448 | | |
| 41 | −3.0305 | 0.2004 | 1.80401 | 46.57 |
| 42 | 10.4311 | 0.0202 | | |
| 43 | 11.3321 | 1.2723 | 1.49700 | 81.59 |
| 44 | −4.9854 | 0.0801 | | |
| 45 | 23.3113 | 1.5929 | 1.49700 | 81.59 |
| 46 | −5.0487 | DD[46] | | |
| 47 | 40.8512 | 0.6492 | 1.84666 | 23.79 |
| 48 | −23.8677 | 2.5736 | | |
| 49 | ∞ | 4.6084 | 1.51633 | 64.14 |
| 50 | ∞ | 0.6011 | 1.48749 | 70.44 |
| 51 | ∞ | | | |

TABLE 11

Example 4

| | WIDE | TELE |
|---|---|---|
| Zr | 1.0 | 1.1 |
| \|f\| | 1.000 | 1.100 |
| FNo. | 2.30 | 2.39 |
| 2ω(°) | 137.4 | 133.6 |
| DD[24] | 19.1962 | 17.8597 |
| DD[27] | 2.7430 | 3.2211 |
| DD[40] | 0.4007 | 1.2591 |

TABLE 12

Example 4

| Sn | 1 | 2 |
|---|---|---|
| KA | −7.61482685625062E−01 | −3.48820069068000E−02 |
| A3 | 4.48718620163584E−02 | 5.26539429009046E−02 |
| A4 | −1.25772376578764E−02 | −2.35192827713908E−02 |
| A5 | 1.17328974454347E−03 | 6.09684940425733E−03 |
| A6 | 1.01150440615941E−03 | −3.45842722148364E−04 |

TABLE 12-continued

Example 4

| | | |
|---|---|---|
| A7 | −4.71087645667198E−04 | −1.93057761376087E−04 |
| A8 | 5.32606619184818E−05 | 5.25113521330363E−06 |
| A9 | 1.64402892568592E−05 | 2.37333347730899E−05 |
| A10 | −5.33677323459338E−06 | −5.38557720854881E−06 |
| A11 | 1.01752307653625E−07 | −4.16550452563486E−07 |
| A12 | 1.56359748385448E−07 | 2.73855412981765E−07 |
| A13 | −1.73864392822687E−08 | −1.44951161570651E−08 |
| A14 | −1.82500146779321E−09 | −5.54968462788549E−09 |
| A15 | 4.04244560136768E−10 | 6.68051901507013E−10 |
| A16 | 7.23061816136780E−13 | 4.19540150418387E−11 |
| A17 | −3.99331066614575E−12 | −9.81488014276557E−12 |
| A18 | 1.54374047192545E−13 | 1.26824795376705E−13 |
| A19 | 1.49100996101607E−14 | 5.03747976356693E−14 |
| A20 | −9.08964200558995E−16 | −2.37731880897422E−15 |

| Sn | 23 | 24 |
|---|---|---|
| KA | 1.00000000000000E+00 | 1.00000000000000E+00 |
| A3 | 0.00000000000000E+00 | 0.00000000000000E+00 |
| A4 | 7.15591450372122E−03 | 9.08219004449408E−03 |
| A5 | −7.28524932121258E−04 | −2.16902335677088E−03 |
| A6 | −2.09657235618946E−04 | 7.63384665063739E−04 |
| A7 | 1.17197447730854E−04 | 1.12209225993568E−04 |
| A8 | −8.32628208165924E−05 | −2.81537578189635E−04 |
| A9 | −1.03924089404257E−05 | 4.03326112910139E−05 |
| A10 | 1.53231447272433E−05 | 2.80828926771231E−05 |
| A11 | 6.23607845585638E−07 | −6.42560572520872E−06 |
| A12 | −1.42481529337400E−06 | −1.40429736602950E−06 |
| A13 | −3.64647242255253E−08 | 4.20407043947482E−07 |
| A14 | 8.32111465848716E−08 | 3.71655073382448E−08 |
| A15 | 1.64435005616520E−09 | −1.43756290825877E−08 |
| A16 | −3.00484641194511E−09 | −4.48943083704988E−10 |
| A17 | −3.92053540813775E−11 | 2.53144261697222E−10 |
| A18 | 6.02641609392248E−11 | 4.34490124357363E−13 |
| A19 | 3.53747727584050E−13 | −1.81671241627088E−12 |
| A20 | −5.08288253295518E−13 | 2.64222121888157E−14 |

Example 5

Figure 14:
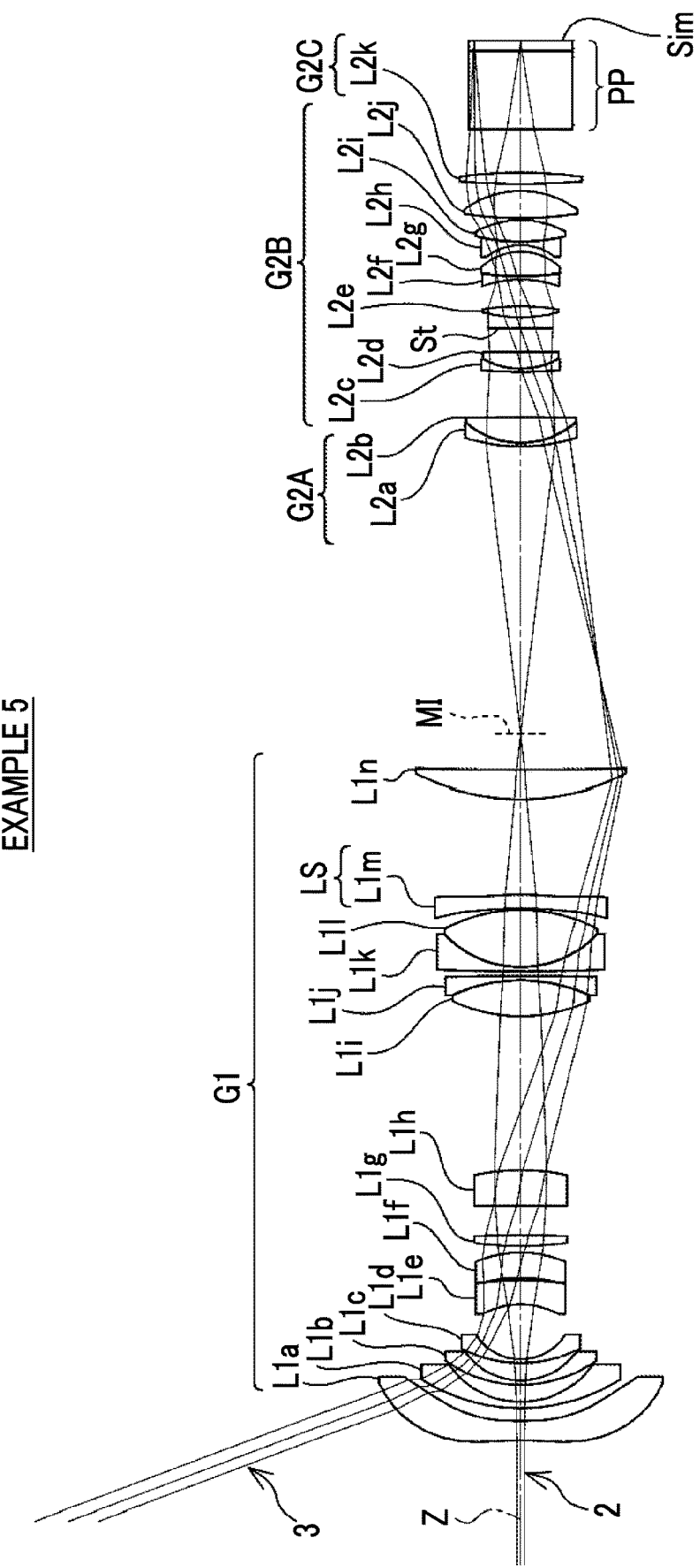
FIG. 14 is a cross-sectional view showing a configuration and luminous flux of an image forming optical system according to Example 5.

FIG. 14 shows a cross-sectional view of a lens configuration and luminous flux of the image forming optical system according to Example 5. The image forming optical system according to Example 5 is a zoom lens, and consists of a first optical system G1 and a second optical system G2 in order from the magnification side to the reduction side. The intermediate image MI is formed between the first optical system G1 and the second optical system G2. The first optical system G1 consists of lenses L1a to L1n in order from the magnification side to the reduction side. The second optical system G2 consists of a second A lens group G2A, a second B lens group G2B, and a second C lens group G2C in order from the magnification side to the reduction side. During varying a magnification, the second A lens group G2A and the second B lens group G2B move by changing the mutual spacing, and the first optical system G1 and the second C lens group G2C remain stationary with respect to the image plane. The second A lens group G2A consists of lenses L2a and L2b in order from the magnification side to the reduction side. The second B lens group G2B consists of lenses L2c to L2d, an aperture stop St, and lenses L2e to L2j in this order from the magnification side to the reduction side. The second C lens group G2C consists of a lens L2k. During focusing, a focus group consisting of lenses L1e to L1f moves along the optical axis Z, and the other lenses remain stationary with respect to the image plane on the reduction side.

Figure 15:
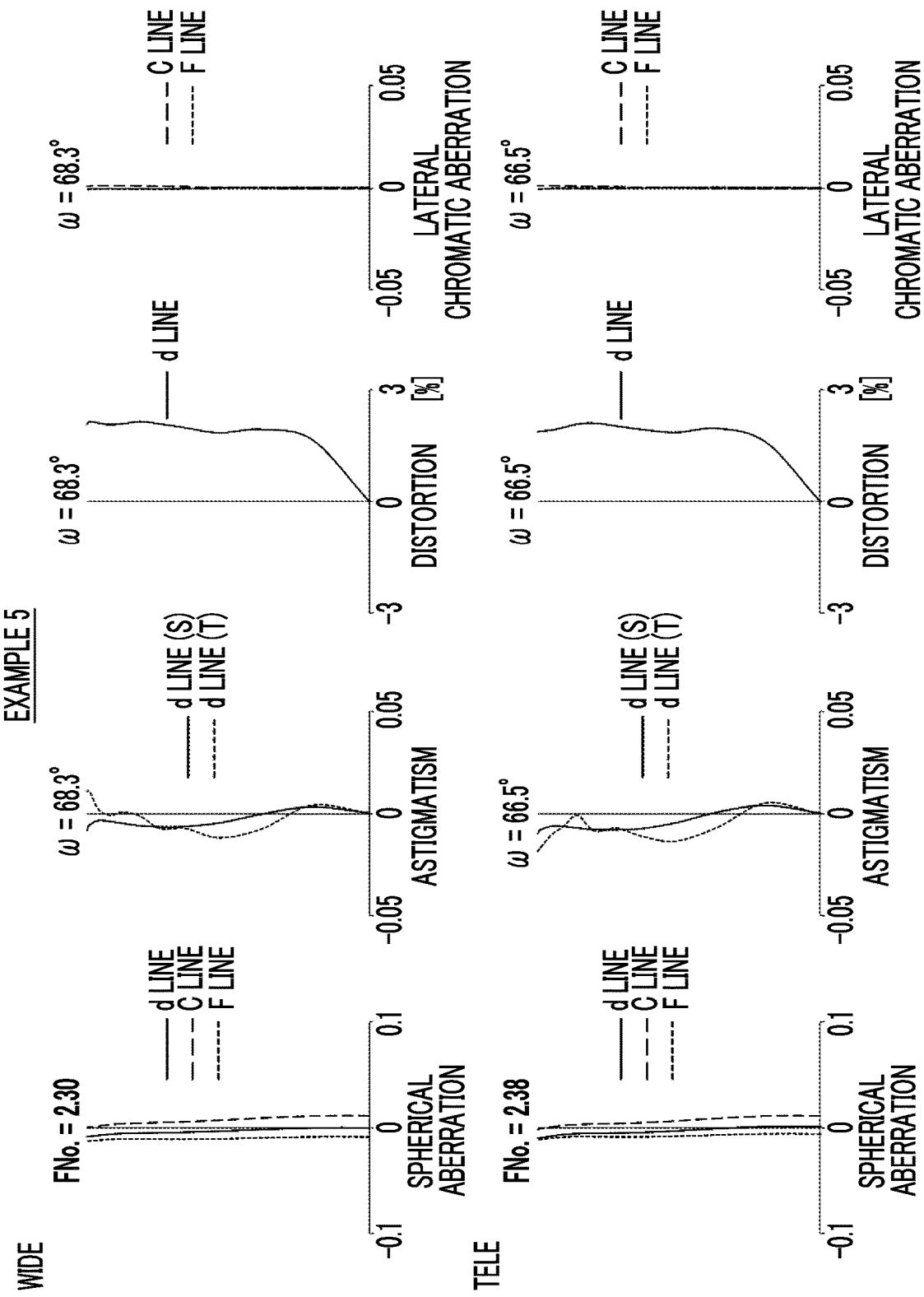
FIG. 15 is an aberration diagram of the image forming optical system according to Example 5.

Regarding the image forming optical system of Example 5, Tables 13A and 13B show the basic lens data, Table 14 shows specification and variable surface distances, Table 15 shows aspherical surface coefficients thereof, and FIG. 15 shows aberration diagrams in a case where the magnification ratio is 150 times.

TABLE 13A

Example 5

| Sn | R | D | Nd | vd |
|---|---|---|---|---|
| *1 | −6.3776 | 1.1213 | 1.53158 | 55.08 |
| *2 | −66.0156 | 0.7540 | | |
| 3 | 9.9130 | 0.3604 | 1.77250 | 49.60 |
| 4 | 4.7233 | 1.0153 | | |
| 5 | 6.9529 | 0.2503 | 1.84666 | 23.78 |
| 6 | 3.7029 | 1.0288 | | |
| 7 | 6.9047 | 0.2203 | 1.77250 | 49.60 |
| 8 | 2.8722 | 3.2221 | | |
| 9 | −4.2714 | 1.4054 | 1.48749 | 70.44 |
| 10 | −17.4782 | 0.1412 | | |
| 11 | −9.4135 | 1.4689 | 1.51742 | 52.43 |
| 12 | −6.0983 | 0.3843 | | |
| 13 | 18.1137 | 0.6406 | 1.80518 | 25.45 |
| 14 | −64.7909 | 1.7173 | | |
| 15 | ∞ | 2.1128 | 1.77250 | 49.60 |
| 16 | −11.5214 | 9.0373 | | |
| 17 | 8.6480 | 2.1030 | 1.49700 | 81.61 |
| 18 | −8.6478 | 0.2603 | 1.84666 | 23.78 |
| 19 | −144.7073 | 0.2703 | | |
| 20 | 108.9318 | 0.2503 | 1.84666 | 23.78 |
| 21 | 5.6141 | 3.3583 | 1.59282 | 68.62 |
| 22 | −8.6386 | 0.1001 | | |
| *23 | −10.7269 | 0.8009 | 1.51633 | 64.06 |
| *24 | −11.0126 | 5.6053 | | |
| 25 | 12.3472 | 1.6685 | 1.84666 | 23.78 |
| 26 | 182.4267 | DD[26] | | |

TABLE 13B

Example 5

| Sn | R | D | Nd | vd |
|---|---|---|---|---|
| 27 | 9.6676 | 0.2002 | 1.84666 | 23.78 |
| 28 | 4.4854 | 1.5066 | 1.80610 | 33.27 |
| 29 | −106.2914 | DD[29] | | |
| 30 | 25.1177 | 0.1802 | 1.84666 | 23.78 |
| 31 | 4.0649 | 0.0200 | | |
| 32 | 4.1974 | 0.9611 | 1.51633 | 64.14 |
| 33 | ∞ | 1.3951 | | |
| 34(St) | ∞ | 0.6581 | | |
| 35 | 7.5593 | 0.6392 | 1.80518 | 25.46 |
| 36 | −13.7539 | 1.5774 | | |
| 37 | −6.1630 | 0.1802 | 1.91082 | 35.25 |
| 38 | 12.1599 | 0.0227 | | |
| 39 | 14.2825 | 1.4015 | 1.48749 | 70.44 |
| 40 | −3.1590 | 0.3921 | | |
| 41 | −2.9758 | 0.2002 | 1.80400 | 46.58 |
| 42 | 9.9854 | 0.0206 | | |
| 43 | 10.8574 | 1.2472 | 1.49700 | 81.61 |
| 44 | −4.9723 | 0.1191 | | |
| 45 | 20.2892 | 1.6008 | 1.49700 | 81.54 |
| 46 | −5.1198 | DD[46] | | |
| 47 | 40.2369 | 0.6614 | 1.84666 | 23.78 |
| 48 | −23.8510 | 2.5516 | | |
| 49 | ∞ | 4.6053 | 1.51633 | 64.14 |
| 50 | ∞ | 0.6007 | 1.48749 | 70.44 |
| 51 | ∞ | | | |

TABLE 14

Example 5

| | WIDE | TELE |
|---|---|---|
| Zr | 1.0 | 1.1 |
| |f| | 1.000 | 1.100 |
| FNo. | 2.30 | 2.38 |
| 2ω(°) | 136.8 | 133.0 |
| DD[24] | 18.9861 | 17.6674 |

TABLE 14-continued

Example 5

|  | WIDE | TELE |
| --- | --- | --- |
| DD[27] | 2.6768 | 3.1313 |
| DD[40] | 0.4154 | 1.2796 |

TABLE 15

Example 5

| Sn | 1 | 2 |
| --- | --- | --- |
| KA | −7.15470538502235E−01 | −4.56118921079977E+00 |
| A3 | 4.10323205834210E−02 | 4.62472289173492E−02 |
| A4 | −1.10384947754803E−02 | −1.94926336851639E−02 |
| A5 | 1.18913447850064E−03 | 4.40829250667600E−03 |
| A6 | 8.20104189028415E−04 | −1.64148225673701E−04 |
| A7 | −4.32143042120906E−04 | −3.64071229376077E−05 |
| A8 | 6.66278123522852E−05 | −1.53716983422264E−05 |
| A9 | 1.16391301909143E−05 | 4.84520522952626E−06 |
| A10 | −5.73083981809694E−06 | −1.41712735308070E−06 |
| A11 | 3.68934465172774E−07 | 3.59442604243119E−07 |
| A12 | 1.54984972722772E−07 | 3.91431527699028E−08 |
| A13 | −2.54284422747766E−08 | −2.75299856754701E−08 |
| A14 | −1.43776887285310E−09 | 1.16650541540924E−09 |
| A15 | 5.39034050058256E−10 | 6.91105991870856E−10 |
| A16 | −9.16925988338114E−12 | −5.98489640942480E−11 |
| A17 | −5.17699658569321E−12 | −7.91501770391064E−12 |
| A18 | 2.60832568970038E−13 | 8.83592527581799E−13 |
| A19 | 1.91567367350475E−14 | 3.45177029879595E−14 |
| A20 | −1.34084259768630E−15 | −4.46897149939444E−15 |
| Sn | 23 | 24 |
| KA | 1.00000000000000E+00 | 1.00000000000000E+00 |
| A3 | 4.26081546872723E−19 | −1.27394241987954E−18 |
| A4 | 1.27411628761839E−02 | 1.42640155482926E−02 |
| A5 | −4.58484415197001E−03 | −5.74120819153891E−03 |
| A6 | −1.24148699741969E−03 | −2.51150236039116E−04 |
| A7 | 1.26901730758177E−03 | 1.10032828584663E−03 |
| A8 | −9.33972818151575E−05 | −2.66544756320036E−04 |
| A9 | −1.66452551610536E−04 | −8.98012672474095E−05 |
| A10 | 3.38471766885409E−05 | 4.11446892500570E−05 |
| A11 | 1.21241947942342E−05 | 2.88784685612592E−06 |
| A12 | −3.50510327169632E−06 | −2.95600431778249E−06 |
| A13 | −5.22196488260713E−07 | 4.52487192926233E−08 |
| A14 | 1.94311333436455E−07 | 1.19072109386391E−07 |
| A15 | 1.32100575840902E−08 | −6.17613520240278E−09 |
| A16 | −6.24243689970706E−09 | −2.72290594172356E−09 |
| A17 | −1.79441333595573E−10 | 1.69443784624048E−10 |
| A18 | 1.10101765933267E−10 | 3.23937952575278E−11 |
| A19 | 9.84166157100602E−13 | −1.58382732848104E−12 |
| A20 | −8.28474968053203E−13 | −1.49618331491770E−13 |

Table 16 shows corresponding values of Conditional Expressions (1), (2), and (6) to (9) of the image forming optical systems of Examples 1 to 5, and Table 17 shows numerical values relating to Conditional Expressions. Tables 16 and 17 show values based on the d line at the wide-angle end. The values shown in Tables 16 and 17 are values rounded to a predetermined digit.

TABLE 16

| Expression Number |  | Example 1 | Example 2 | Example 3 | Example 4 | Example 5 |
| --- | --- | --- | --- | --- | --- | --- |
| (1) | Ymax/|f| | 2.60 | 2.60 | 2.63 | 2.60 | 2.60 |
| (2) | |f|/fA | 0.0217 | 0.0194 | 0.0193 | 0.0173 | −0.0001 |
| (6) | |Ra2/H2| | 2.04 | 2.47 | 2.46 | 2.10 | 2.87 |
| (7) | (1/Rb1 − 1/Rb2) × |f| | −0.037 | −0.037 | −0.035 | −0.031 | −0.051 |
| (8) | |H2/(2.5 × f)| | 1.53 | 1.53 | 1.54 | 1.52 | 1.53 |
| (9) | |Hmax/H2| | 1.36 | 1.36 | 1.35 | 1.36 | 1.37 |

TABLE 17

|  | Example 1 | Example 2 | Example 3 | Example 4 | Example 5 |
| --- | --- | --- | --- | --- | --- |
| |f| | 1.000 | 1.000 | 1.000 | 1.000 | 1.000 |
| Ymax | 2.60 | 2.60 | 2.63 | 2.60 | 2.60 |
| fA | 46.09 | 51.47 | 51.82 | 57.85 | −17604 |
| Ra1 | −11.2155 | −14.2751 | −14.2617 | −10.5813 | −10.7269 |
| Ra2 | −7.8084 | −9.4643 | −9.4806 | −8.0156 | −11.0126 |
| |H1| | 3.72 | 3.72 | 3.74 | 3.70 | 3.70 |
| |H2| | 3.83 | 3.83 | 3.85 | 3.81012 | 3.83 |
| Rb1 | −25.128 | −24.708 | −26.909 | −28.843 | −19.180 |
| Rb2 | −343.465 | −260.673 | −549.211 | −241.143 | −794.019 |
| |Hmax| | 5.21 | 5.21 | 5.19 | 5.17 | 5.267 |

As can be seen from the above-mentioned data, the image forming optical systems of Examples 1 to 5 each is configured to have an F number of 2.4 or less at the wide-angle end, a total angle of view of 130 degrees or more at the wide-angle end, and a small size. With such a configuration, the image forming optical systems each achieve high optical performance by satisfactorily correcting aberrations while having excellent manufacturability and assembling property.

Figure 16:
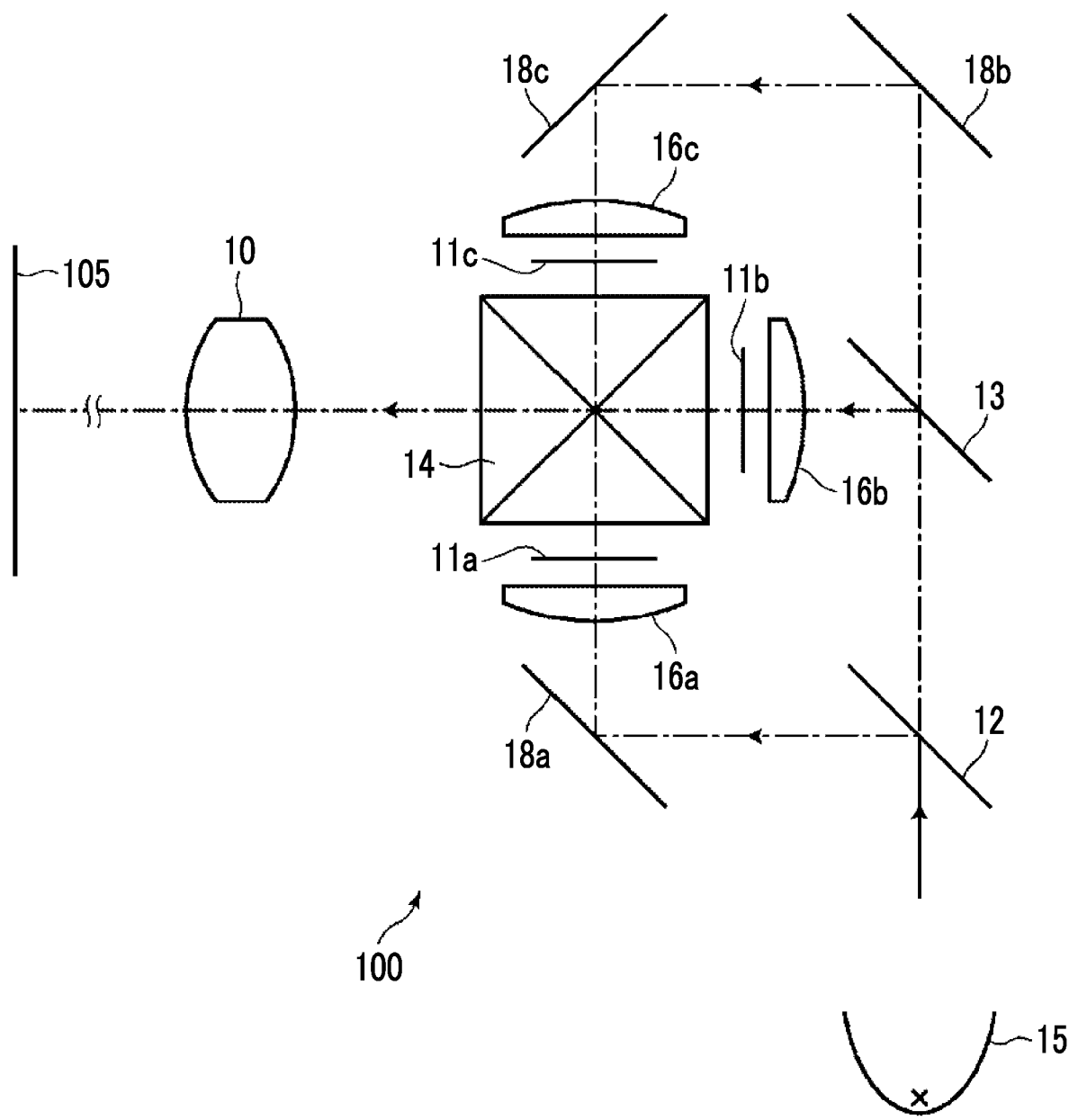
FIG. 16 is a schematic configuration diagram of a projection type display device according to an embodiment.

Next, a projection type display device according to an embodiment of the present disclosure will be described. FIG. 16 is a schematic configuration diagram of a projection type display device according to an embodiment of the present disclosure. The projection type display device 100 shown in FIG. 16 has the image forming optical system 10 according to the embodiment of the present disclosure, a light source 15, transmissive display elements 11a to 11c as light valves each corresponding to each color light, dichroic mirrors 12 and 13 for color separation, a cross dichroic prism 14 for color synthesis, condenser lenses 16a to 16c, and total reflection mirrors 18a to 18c that deflect the optical path. In addition, FIG. 16 schematically shows the image forming optical system 10. Further, an integrator is disposed between the light source 15 and the dichroic mirror 12, but is not shown in FIG. 16.

White light originating from the light source 15 is separated into ray with three colors (green light, blue light, and red light) through the dichroic mirrors 12 and 13. Thereafter, the ray respectively pass through the condenser lenses 16a to 16c, are incident into and modulated through the transmissive display elements 11a to 11c respectively corresponding to the ray with the respective colors, are subjected to color synthesis through the cross dichroic prism 14, and are subsequently incident into the image forming optical system 10. The image forming optical system 10 projects an optical image, which is formed by the light modulated through the transmissive display elements 11a to 11c, onto a screen 105.

Figure 17:
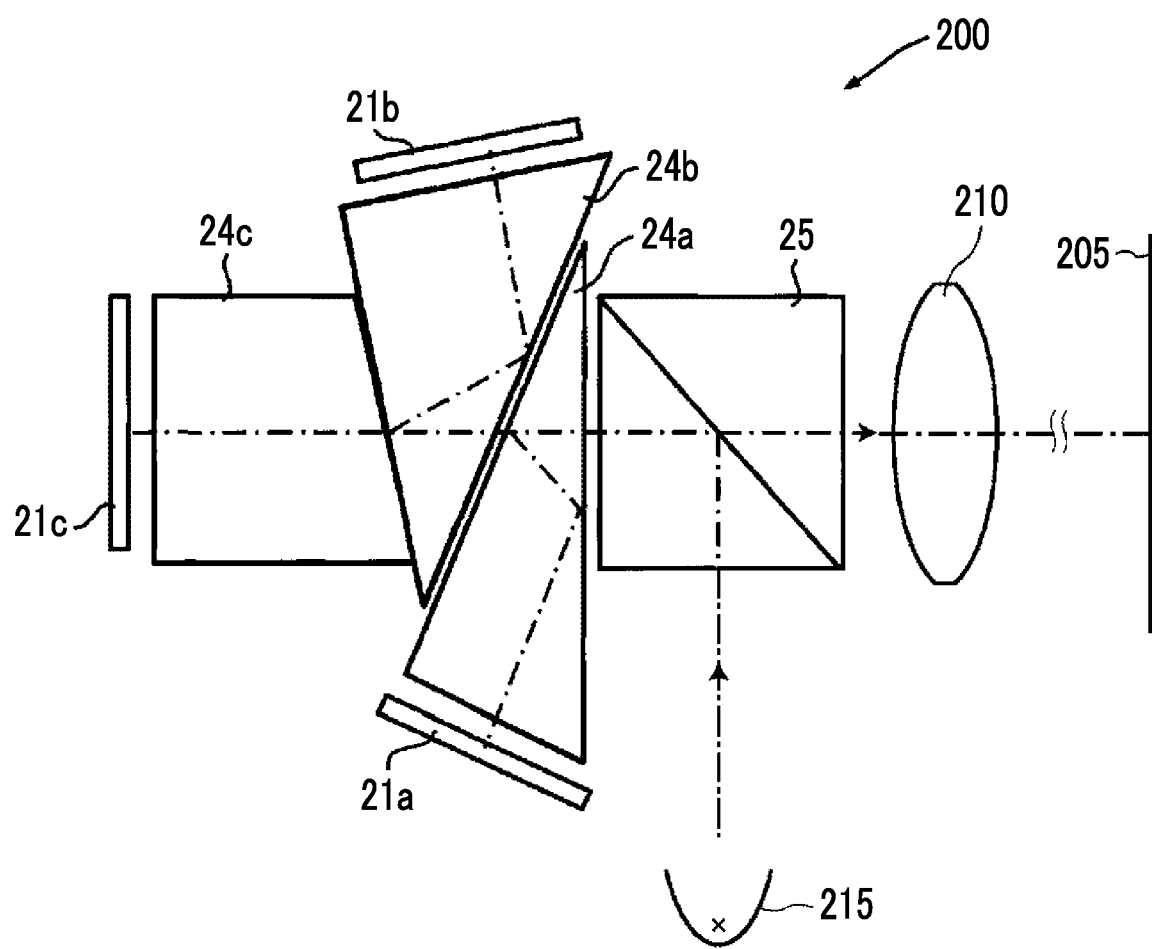
FIG. 17 is a schematic configuration diagram of a projection type display device according to another embodiment.

FIG. 17 is a schematic configuration diagram of a projection type display device according to another embodiment of the present disclosure. The projection type display device 200 shown in FIG. 17 has an image forming optical system 210 according to the embodiment of the present disclosure, a light source 215, digital micromirror device (DMD: registered trademark) elements 21a to 21c as light valves corresponding to respective color ray, total internal reflection (TIR) prisms 24a to 24c for color separation and color synthesis, and a polarized light separating prism 25 that separates illumination light and projection light. In addition, FIG. 17 schematically shows the image forming optical system 210. Further, an integrator is disposed between the light source 215 and the polarized light separating prism 25, but is not shown in FIG. 17.

White light originating from the light source 215 is reflected on a reflecting surface inside the polarized light separating prism 25, and is separated into ray with three colors (green light, blue light, and red light) through the TIR prisms 24a to 24c. The separated ray with the respective colors are respectively incident into and modulated through the corresponding DMD elements 21a to 21c, travel through the TIR prisms 24a to 24c again in a reverse direction, are subjected to color synthesis, are subsequently transmitted through the polarized light separating prism 25, and are incident into the image forming optical system 210. The image forming optical system 210 projects an optical image, which is formed by the light modulated through the DMD elements 21a to 21c, onto a screen 205.

Figure 18:
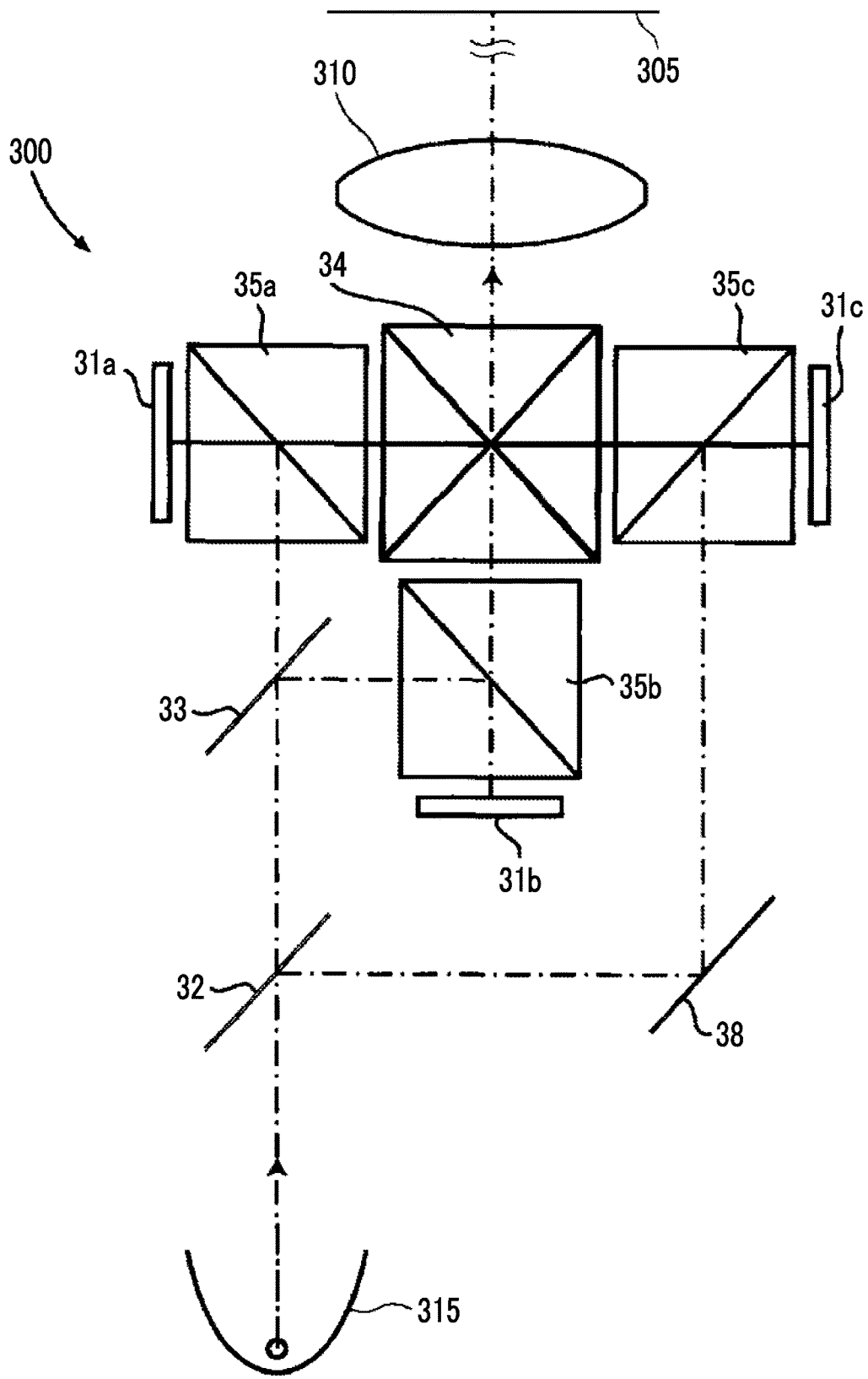
FIG. 18 is a schematic configuration diagram of a projection type display device according to still another embodiment.

FIG. 18 is a schematic configuration diagram of a projection type display device according to still another embodiment of the present disclosure. The projection type display device 300 shown in FIG. 18 has an image forming optical system 310 according to the embodiment of the present disclosure, a light source 315, reflective display elements 31a to 31c as light valves each corresponding to each color light, dichroic mirrors 32 and 33 for color separation, a cross dichroic prism 34 for color synthesis, a total reflection mirror 38 for deflecting the optical path, and polarized light separating prisms 35a to 35c. In addition, FIG. 18 schematically shows the image forming optical system 310. Further, an integrator is disposed between the light source 315 and the dichroic mirror 32, but is not shown in FIG. 18.

White light originating from the light source 315 is separated into ray with three colors (green light, blue light, and red light) through the dichroic mirrors 32 and 33. The separated ray with the respective colors respectively pass through the polarized light separating prisms 35a to 35c, are incident into and modulated through the reflective display elements 31a to 31c respectively corresponding to the ray with the respective colors, are subjected to color synthesis through the cross dichroic prism 34, and are subsequently incident into the image forming optical system 310. The image forming optical system 310 projects an optical image, which is formed by the light modulated through the reflective display elements 31a to 31c, onto a screen 305.

Figure 19:
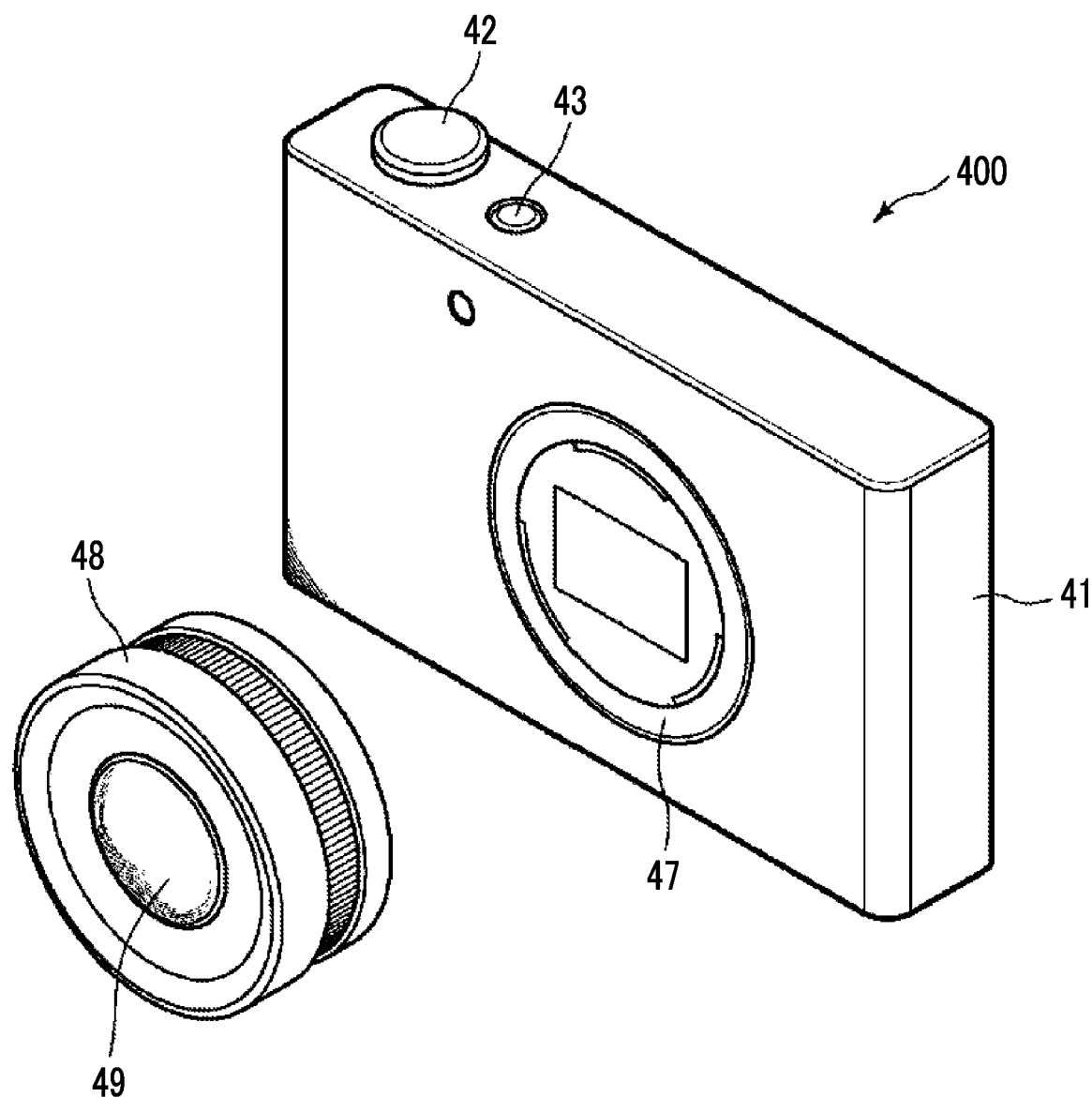
FIG. 19 is a perspective view of the front side of an imaging apparatus according to an embodiment.
Figure 20:
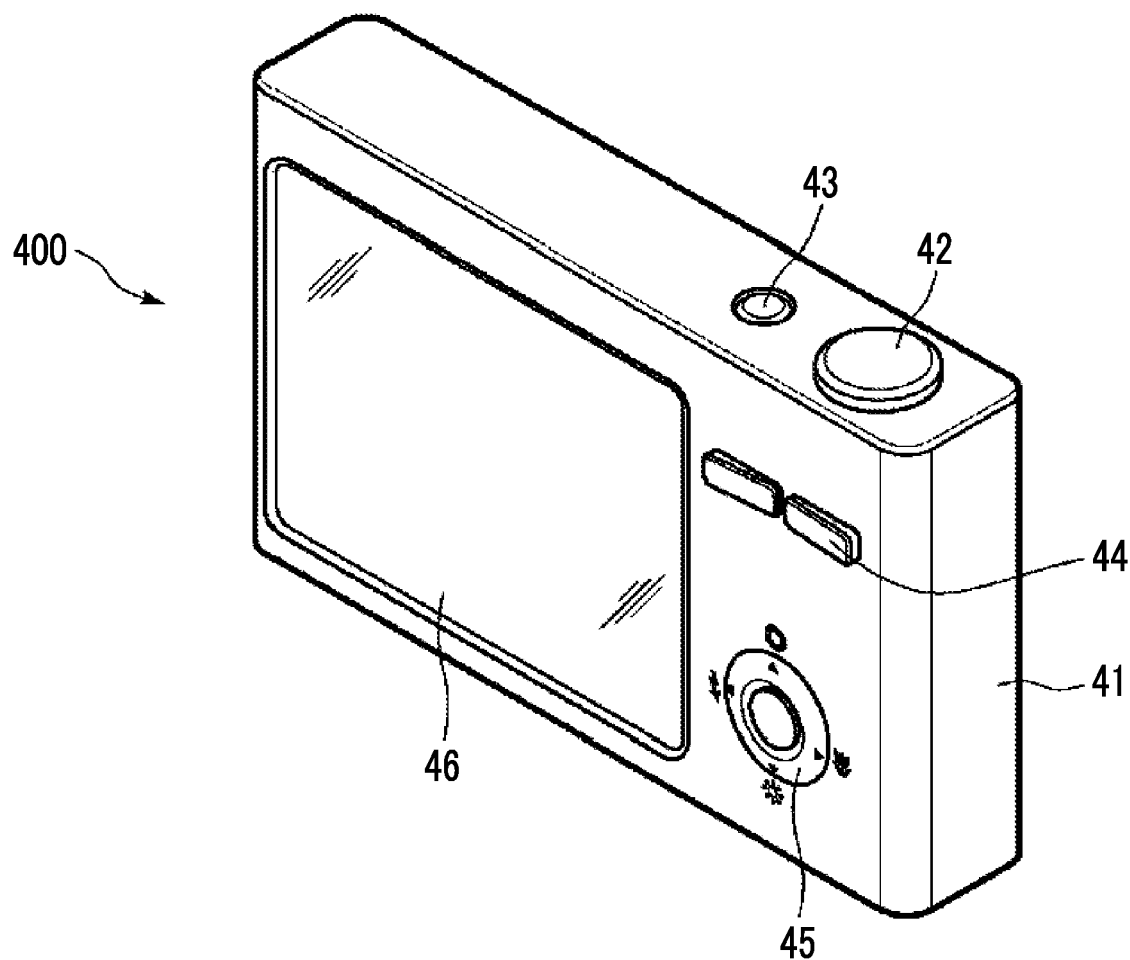
FIG. 20 is a rear perspective view of the imaging apparatus shown in FIG. 19.

FIGS. 19 and 20 are external views of a camera 400 which is the imaging apparatus according to the embodiment of the present disclosure. FIG. 19 is a perspective view of the camera 400 viewed from the front side, and FIG. 20 is a perspective view of the camera 400 viewed from the rear side. The camera 400 is a mirrorless single-lens type digital camera on which an interchangeable lens 48 is attachably and detachably mounted. The interchangeable lens 48 is configured such that an image forming optical system 49 as the optical system according to the embodiment of the present disclosure is housed in a lens barrel.

The camera 400 comprises a camera body 41, and a shutter button 42 and a power button 43 are provided on an upper surface of the camera body 41. Further, operating parts 44 and 45 and a display unit 46 are provided on a rear surface of the camera body 41. The display unit 46 displays a captured image or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a recording medium, and the like. The imaging element (not shown in the drawing) such as a charge coupled device (CCD) or a complementary metal oxide semiconductor (CMOS) outputs a imaging signal based on a subject image which is formed through the interchangeable lens 48. The signal processing circuit (not shown in the drawing) generates an image through processing of the imaging signal which is output from the imaging element. The recording medium (not shown in the drawing) records the generated image. The camera 400 captures a static image or a video by pressing the shutter button 42, and records image data, which is obtained through imaging, in the recording medium.

The technique of the present disclosure has been hitherto described through embodiments and examples, but the technique of the present disclosure is not limited to the above-mentioned embodiments and examples, and may be modified into various forms. For example, values such as the radius of curvature, the surface distance, the refractive index, the Abbe number, and the aspherical surface coefficient of each lens are not limited to the values shown in the numerical examples, and different values may be used therefor.

In addition, the projection type display device according to the technique of the present disclosure is not limited to the above configuration, and may be modified into various forms such as the optical member used for ray separation or ray synthesis and the light valve. The light valve is not limited to a form in which light from a light source is spatially modulated through an image display element and is output as an optical image based on image data, but may be a form in which light itself output from the self-luminous image display element is output as an optical image based on the image data. Examples of the self-luminous image display element include an image display element in which light emitting elements such as light emitting diodes (LED) or organic light emitting diodes (OLED) are two-dimensionally arranged.

Further, the imaging apparatus according to the technique of the present disclosure is not limited to the above configuration, and may be modified into various forms such as a non-mirrorless type camera, a film camera, a video camera, and a camera for movie imaging.

What is claimed is:

1. An image forming optical system consisting of a first optical system and a second optical system in order from a magnification side to a reduction side along an optical path,
wherein an intermediate image is formed on the optical path between the first optical system and the second optical system,
the first optical system includes at least one aspherical lens,
among the aspherical lenses included in the first optical system, a specific lens, which is the aspherical lens closest to the intermediate image on the optical path, has a meniscus shape of which a surface is convex toward the reduction side in a paraxial region, and in a case where a distance from an intersection between an optical axis and a normal line at a certain point P on a lens surface to the point P is a local radius of curvature at the point P, and a sign of the local radius of curvature is negative in a case where the intersection is closer to the magnification side than the point P, and is positive in a case where the intersection is closer to the reduction side than the point P, assuming that a sign of the local radius of curvature at an optional point within an effective diameter of a reduction side surface of the specific lens is negative, a maximum image height of the image forming optical system on the reduction side is Ymax, a focal length of the image forming optical system is f, a focal length of the specific lens is fA, a paraxial radius of curvature of a magnification side surface of the specific lens is Ra1, a paraxial radius of curvature of the reduction side surface of the specific lens is Ra2, a local radius of curvature at an intersection between the magnification side surface of the specific lens and a ray, which is incident into the image forming optical system from an image plane on the reduction side of the image forming optical system in parallel to the optical axis at a height of 2.5×|f| from the optical axis, is Rb1, a local radius of curvature at an intersection between the reduction side surface of the specific lens and the ray is Rb2, a height of the ray from the optical axis on the reduction side surface of the specific lens is H2, and f, Rb1, Rb2, and H2 are values at a wide-angle end in a case where the image forming optical system is a variable magnification optical system, Conditional Expressions (1), (2), (3), (4), (5), and (6) are satisfied, which are represented by $$2.5 \leq Y\max/|f| \leq 2.9 \qquad (1),$$

$$-0.01 < |f|/fA < 0.03 \qquad (2),$$

$$|Ra1| < |Rb1| \qquad (3),$$

$$|Ra2| < |Rb2| \qquad (4),$$

$$|Rb1| < |Rb2| \qquad (5), \text{ and}$$

$$1.65 < |Ra2/H2| < 3 \qquad (6).$$

2. The image forming optical system according to claim 1, wherein Conditional Expression (7) is satisfied, which is represented by $$-0.1 < (1/Rb1 - 1/Rb2) \times |f| < -0.015 \qquad (7).$$

3. The image forming optical system according to claim 2, wherein Conditional Expression (7-1) is satisfied, which is represented by $$-0.1 < (1/Rb1 - 1/Rb2) \times |f| < -0.02 \qquad (7\text{-}1).$$

4. The image forming optical system according to claim 1, wherein assuming that a height of the ray from the optical axis on the magnification side surface of the specific lens is H1, H1 is a value at the wide-angle end in a case where the image forming optical system is a variable magnification optical system, the magnification side surface of the specific lens within a radius |H1| from the optical axis is located, outside the optical axis, closer to the reduction side than a spherical surface that passes through an intersection between the optical axis and the magnification side surface of the specific lens, the spherical surface having a radius |Ra1| and a center that is on the optical axis, and the reduction side surface of the specific lens within a radius |H2| from the optical axis is located, outside the optical axis, closer to the reduction side than a spherical surface that passes through an intersection between the optical axis and the reduction side surface of the specific lens, the spherical surface having a radius |Ra2| and a center that is on the optical axis.

5. The image forming optical system according to claim 1, wherein Conditional Expression (8) is satisfied, which is represented by $$1.35 < |H2/(2.5 \times f)| < 1.8 \qquad (8).$$

6. The image forming optical system according to claim 4, wherein Conditional Expression (8-1) is satisfied, which is represented by $$1.45 < |H2/(2.5 \times f)| < 1.8 \qquad (8\text{-}1).$$

7. The image forming optical system according to claim 1, wherein in a case where one lens component is one cemented lens or one single lens, assuming that a maximum height of heights of the ray from the optical axis at two air contact surfaces intersecting the optical axis of the lens component closest to the reduction side in the first optical system, and heights of the ray from the optical axis at two air contact surfaces intersecting the optical axis of the lens component closest to the magnification side in the second optical system is Hmax, and Hmax is a value at the wide-angle end in a case where the image forming optical system is a variable magnification optical system, Conditional Expression (9) is satisfied, which is represented by $$1 < |H\max/H2| < 1.8 \qquad (9).$$

8. The image forming optical system according to claim 5, wherein Conditional Expression (9-1) is satisfied, which is represented by $$1 < |H\max/H2| < 1.5 \qquad (9\text{-}1).$$

9. The image forming optical system according to claim 1, wherein a sign of a local radius of curvature at an optional point within an effective diameter of the magnification side surface of the specific lens is negative.

10. The image forming optical system according to claim 1, wherein at least one optical path deflection member that deflects the optical path is disposed inside the image forming optical system.

11. The image forming optical system according to claim 1, wherein the image forming optical system is a zoom optical system.

12. The image forming optical system according to claim 8, wherein the second optical system includes a lens group that moves during varying a magnification.

13. The image forming optical system according to claim 1, wherein the image forming optical system is configured to be telecentric on the reduction side.

14. The image forming optical system according to claim 1, wherein Conditional Expression (1-1) is satisfied, which is represented by $$2.5 \leq Y\max/|f| \leq 2.7 \tag{1-1}$$

15. The image forming optical system according to claim 1, wherein Conditional Expression (2-1) is satisfied, which is represented by $$-0.01 < |f|/fA < 0.025 \tag{2-1}$$

16. The image forming optical system according to claim 1, wherein Conditional Expression (6-1) is satisfied, which is represented by $$1.75 < |Ra2/H2| < 3 \tag{6-1}$$

17. A projection type display device comprising:
a light valve that outputs an optical image; and
the image forming optical system according to claim 1,
wherein the image forming optical system projects the optical image, which is output from the light valve, on a screen.

18. An imaging apparatus comprising the image forming optical system according to claim 1.

* * * * *